United States Patent [19]
Nagai et al.

[11] Patent Number: 5,982,151
[45] Date of Patent: Nov. 9, 1999

[54] BATTERY CHARGER AND BATTERY CHARGING METHOD

[75] Inventors: Tamiji Nagai; Toshitaka Takei, both of Kanagawa; Kuniharu Suzuki, Tokyo, all of Japan

[73] Assignee: Sony Corporation, Tokyo, Japan

[21] Appl. No.: 09/010,528

[22] Filed: Jan. 22, 1998

[30] Foreign Application Priority Data

Feb. 3, 1997 [JP] Japan .................................. 9-020743

[51] Int. Cl.$^6$ ....................................................... H02J 7/04
[52] U.S. Cl. .......................... 320/141; 320/145; 323/299
[58] Field of Search .................................... 320/141, 142, 320/143, 144, 145, 162–164, 160; 323/271, 266, 268, 299

[56] References Cited

U.S. PATENT DOCUMENTS

| | | | |
|---|---|---|---|
| 4,177,389 | 12/1979 | Schott ......................................... | 307/64 |
| 4,272,806 | 6/1981 | Metzger ................................... | 320/149 |
| 5,682,305 | 10/1997 | Kurotami et al. ....................... | 323/299 |
| 5,710,506 | 1/1998 | Broell et al. ............................. | 320/145 |
| 5,867,011 | 2/1999 | Jo et al. .................................... | 323/299 |
| 5,869,956 | 2/1999 | Nagao et al. ............................. | 323/299 |
| 5,892,354 | 4/1999 | Nagao et al. ............................. | 323/299 |

*Primary Examiner*—Peter S. Wong
*Assistant Examiner*—K. Shin
*Attorney, Agent, or Firm*—Jay H. Maioli

[57] ABSTRACT

In a battery charger, current regulating means and voltage regulating means can be prevented from damages. In the case where a loss of current regulating means (11) or voltage regulating means (12) exceeds an allowable loss, pulse width modulating means (15, 16) for generating a pulse signal having a desired pulse width and control means (18, 19) for intermittently operating the current regulating means or the voltage regulating means, having the loss exceeding the allowable loss, based on the pulse signal are provided to suppress the loss of the current regulating means or the voltage regulating means and suppress heat generated thereby, thus the current regulating means and the voltage regulating means can be protected from damages.

19 Claims, 27 Drawing Sheets

BATTERY CHARGER AND BATTERY CHARGING METHOD

BACKGROUND OF THE INVENTION

1. Field of the Invention

This invention relates to a battery charger and battery charging method, and more particularly, is suitably applied to a battery charger having a voltage regulating circuit and a current regulating circuit.

2. Description of the Related Art

Secondary batteries have been used as a power source in portable electronic apparatus such as a portable telephone, a camera integrated VTR, and so on. When these portable electronic apparatus are used, the secondary batteries must be charged prior to their use.

When the secondary battery is charged, a secondary battery is likely to be damaged if applied with a charging voltage and a charging current above its rated values. Therefore, a battery charger generally has a voltage regulating circuit and a current regulating circuit for preventing a secondary battery from being applied with a charging voltage and a charging current above its rated values.

Here, such a battery charger is shown in FIG. 1. As shown in FIG. 1, a battery charger 1 has a current regulating circuit 2 and a voltage regulating circuit 3 which are connected in series, wherein an input voltage and an input current from an alternating-current transformer (AC adapter) 4 connected thereto as a direct current power source are used to supply a secondary battery BT with a charging current at or below a rated value through the current regulating circuit 2 and to supply the secondary battery BT with a charging voltage at or below a rated value through the voltage regulating circuit 3.

The battery charger 1 configured as described above, however, has a problem in that while the current regulating circuit 2 and the voltage regulating circuit 3 can prevent the secondary battery BT from damages, the current regulating circuit 2 and the voltage regulating circuit 3 themselves cannot be protected from being damaged. Generally, as a direct current power source to be supplied to the battery charger 1, a direct current power source having an output voltage and an output current adapted to the battery charger 1 is used. However, if a user uses a direct current power source having an output voltage and an output current not adapted to the battery charger 1, the current regulating circuit 2 and the voltage regulating circuit 3 are likely to receive an input current and an input voltage above their rated values, thereby causing a problem in that heat above a rated value occurs in the current regulating circuit 2 and the voltage regulating circuit 3 to cause damages in the current regulating circuit 2 and the voltage regulating circuit 3.

SUMMARY OF THE INVENTION

In view of the foregoing, an object of this invention is to provide a battery charger and a battery charging method in which damages of a current regulating means and a voltage regulating means can be prevented in advance.

The foregoing object and other objects of the invention have been achieved by the provision of a battery charger having current regulating means and voltage regulating means connected in series, which supplies a secondary battery with a charging current at or below a predetermined value with the current regulating means and supplies the secondary battery with a charging voltage at or below a predetermined value with the current regulating means in order to charge the secondary battery, and in the case where a loss of the current regulating means or the voltage regulating means exceeds an allowable loss, the battery charger comprises pulse width modulating means for generating a pulse signal having a desired pulse width, and control means for intermittently operating the current regulating means or the voltage regulating means, having the loss exceeding the allowable loss, based on the pulse signal.

In the case where a loss of the current regulating means or the voltage regulating means exceeds the allowable loss as described above, the current regulating means or the voltage regulating means is intermittently operated by the pulse signal to suppress the loss of the current regulating means or the voltage regulating means and suppress heat generated thereby, so that the current regulating means or the voltage regulating means can be protected from damages.

Also, in the present invention, a battery charger having current regulating means and voltage regulating means connected in series, which uses an input voltage and an input current to be supplied thereto from a power source to supply a secondary battery with a charging current at or below a predetermined value with the current regulating means and to supply the secondary battery with a charging voltage at or below a predetermined value with the voltage regulating means in order to charge the secondary battery, comprises first pulse width modulating means for generating a first pulse signal having a desired pulse width if a loss of the current regulating means exceeds an allowable loss, second pulse width modulating means for generating a second pulse signal having a desired pulse width if a loss of the voltage regulating means exceeds an allowable loss, priority pulse generating means for selecting a pulse signal having a narrower pulse width out of the first and second pulse signals and outputting the selected pulse signal as a priority pulse signal, and control means for intermittently operating the current regulating means and the voltage regulating means based on the priority pulse signal.

In this way, the current regulating means and the voltage regulating means are intermittently operated based on the priority pulse signal which is a pulse signal having a narrower pulse width selected out of the first pulse signal for the current regulating means and the second pulse signal for the voltage regulating means, so that the losses of the current regulating means and the voltage regulating means can be simultaneously suppressed to prevent heat generated thereby even if the current regulating means and the voltage regulating means have different losses, thereby making it possible to protect the current regulating means and the voltage regulating means from damages.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiment of this invention will be described with reference to the accompanying drawings:

(1) Principles

First, in this paragraph, the principles of the present invention will be explained. Generally, a secondary battery has rated values defined for a voltage and a current used to charge the battery, and it is recommended to charge it with the voltage and the current at the rated values. For example, for lithium ion batteries increasingly used in recent years, a charging current at or below 1 [C] and a charging voltage at or below 4.2 [V] are defined as the rated values. Therefore, a battery charger comprises a current regulating circuit and a voltage regulating circuit so that a secondary battery is supplied with the current and the voltage at the rated values by the current regulating circuit and the voltage regulating circuit.

The current regulating circuit and the voltage regulating circuit also have their rated current and voltage values defined for their input current and input voltage, and an input current and an input voltage to be supplied thereto must be at or below the rated current and voltage values respectively. However, if a user connects a direct current power source, not adapted to the rated current and voltage values, to a battery charger, the current regulating circuit and the voltage regulating circuit are naturally supplied with an input current and an input voltage above the rated current and voltage values. If an input current and an input voltage not adopted as described above are supplied, the current regulating circuit and the voltage regulating circuit suffer circuit losses at or above rated values, thus causing a problem of generating heat at or above a rated value to damage the circuits.

Figure 1:
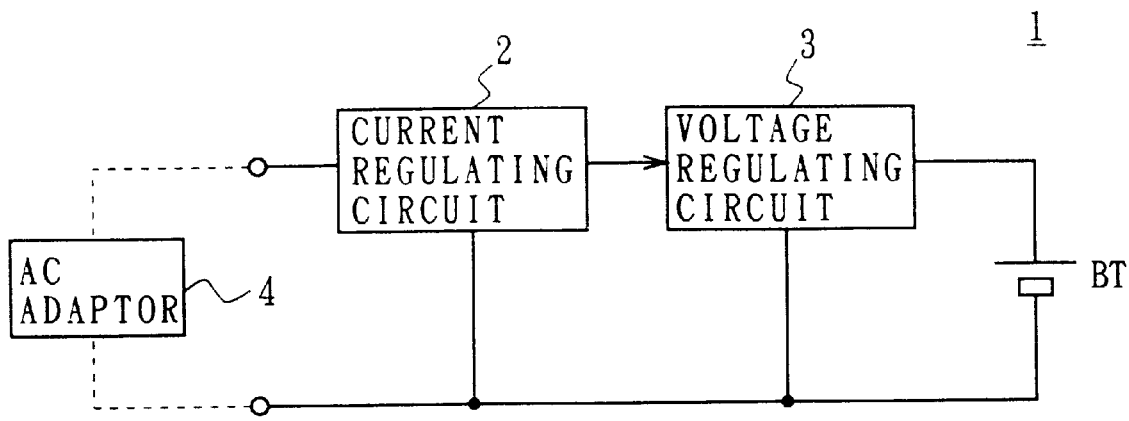
FIG. 1 is a block diagram showing a conventional battery charger.
Figure 2:
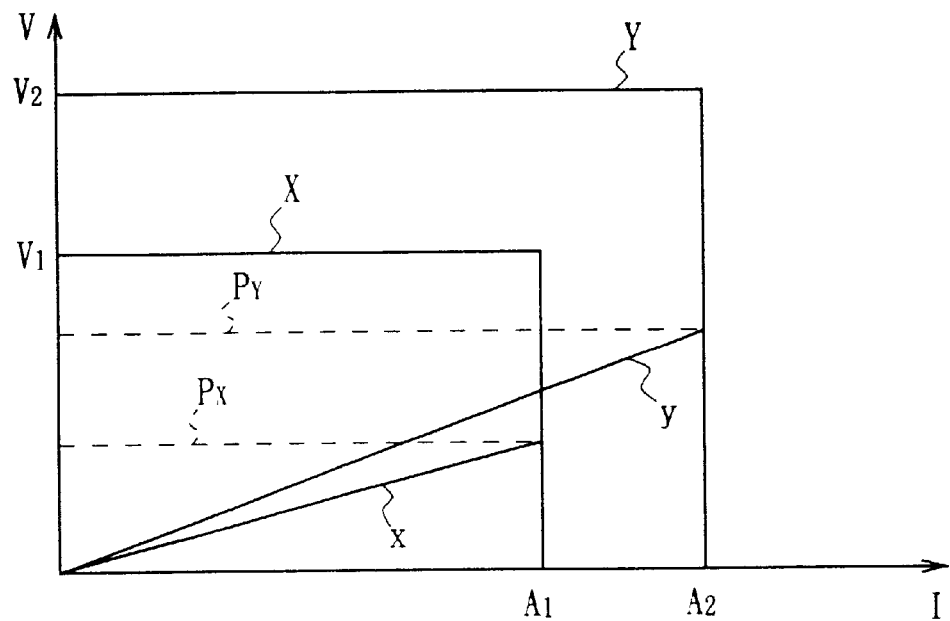
FIG. 2 is a schematic diagram showing a circuit loss explaining the principles of the present invention.

For example, as shown in FIG. 2, assuming that rated values for a current regulating circuit and a voltage regulating circuit are defined as a current $A_1$ [A] and a voltage $V_1$ [V] respectively and an area indicated by X represents an allowable range, when a direct current power source within the allowable range X is connected, circuit losses which are generated in the current regulating circuit and the voltage regulating circuit are indicated by a straight line x and will never exceed an allowable loss $P_X$. However, if a direct current source exceeding the allowable range X is connected, i.e., if a direct current source within a range Y shown in FIG. 2 is connected, circuit losses which are generated in the current regulating circuit and the voltage regulating circuit are indicated by a straight line y and exceeds the allowable loss $P_X$ thus causing in the worst case circuit losses represented by $P_Y$. If losses of the current regulating circuit and the voltage regulating circuit exceed the allowable loss $P_X$ as described above, the circuit losses cause heat at or above the rated values, resulting in damages in the current regulating circuit and the voltage regulating circuit.

Therefore, when a battery charger is supplied with the input current and the input voltage exceeding the allowable range X, the present invention uses a pulse signal having a desired pulse width to intermittently operate the current regulating circuit and the voltage regulating circuit to charge a secondary battery, thereby preventing circuit losses occurring in the current regulating circuit and the voltage regulating circuit from exceeding the allowable loss $P_X$ to protect the circuits from being damaged. Specific embodiments applying the concept of the present invention described above will be sequentially described in the following paragraphs. In the following descriptions, intermittent battery charging using the pulse signal as mentioned above is referred to as the pulse charging.

(2) First Embodiment

Figure 3:
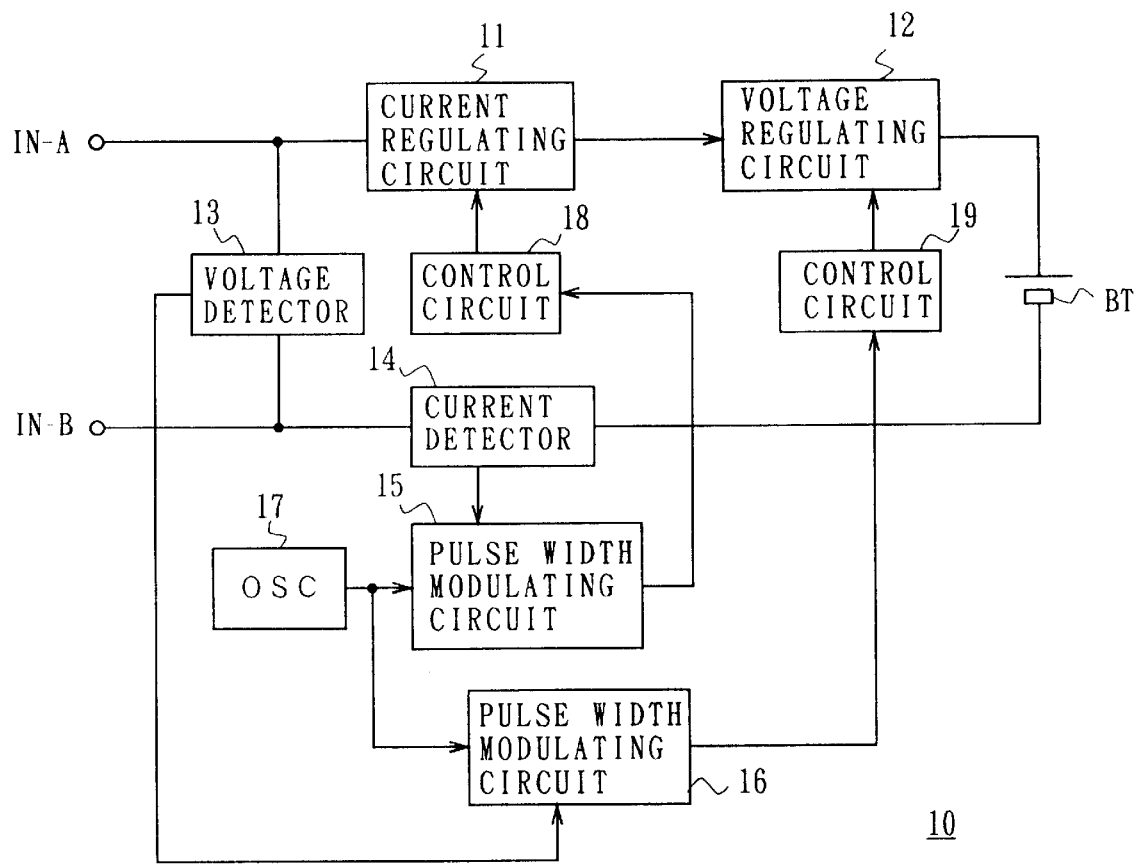
FIG. 3 is a block diagram showing the configuration of a battery charger according to a first embodiment.

In FIG. 3, numeral 10 shows a battery charger according to a first embodiment as a whole, which is arranged to connect a direct current power supply between input terminals IN-A and IN-B. The battery charger 10 is provided with two circuits connected in series between the input terminal IN-A and a positive pole of a secondary battery BT. Specifically, one is a current regulating circuit 11 for supplying the secondary battery BT with a charging current at or below a rated value defined for the battery, and the other is a voltage regulating circuit 12 for supplying the secondary battery BT with a charging voltage at or below a rated value defined for the battery. Therefore, the secondary battery BT is prevented from being supplied with a charging current and a charging voltage exceeding the rated values defined for the battery, so that the secondary battery BT can be protected from damages.

Further, between the input terminals IN-A and IN-B, a voltage detector circuit 13 is arranged for detecting a voltage value of an input voltage supplied from the direct current power source. The result of voltage detection performed by the voltage detector circuit 13 is supplied to a second pulse width modulator circuit 16 described later.

Furthermore, between the input terminal IN-B and a negative pole of the secondary battery BT, a current detector circuit 14 is arranged for detecting a current value of an input current supplied from the direct current power source. The result of current detection performed by the current detector circuit 14 is supplied to a first pulse width modulator circuit 15 described later.

Figure 4A:
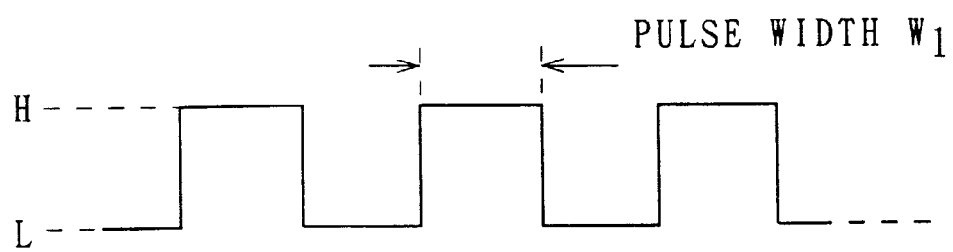
FIGS. 4A and 4B are signal waveform charts showing the waveform of a pulse signal.

The first pulse width modulator circuit 15 determines that an allowable loss is likely to be exceeded when the result of the current detection from the current detector circuit 14 reveals that a detected input current is above a rated current value for the current regulating circuit 11, generates a pulse signal having a desired pulse width $W_1$ in accordance with the input current as shown in FIG. 4A, on the basis of a clock signal supplied from an oscillator (OSC) 17, and supplies the pulse signal to a first control circuit 18. In this connection, the pulse width $W_1$ of the pulse signal is set to an optimal value such that a circuit loss of the current regulating circuit 11 does not exceed its allowable loss.

Note that, the first pulse width modulator circuit 15 generates a signal fixed at logical level "H" which is supplied to the first control circuit 18 when an input current at or below the rated current value is detected from the result of the current detection from the current detector circuit 14.

The first control circuit 18 activates the current regulating circuit 11 when a signal supplied from the pulse width modulator circuit 15 is at logical level "H", and deactivates the current regulating circuit 11 when at logical level "L". In this way, the current regulating circuit 11 is intermittently operated when an input current above the rated current value is detected, while the current regulating circuit 11 is continuously operated when an input current at or below the rated current value is detected.

Figure 4B:
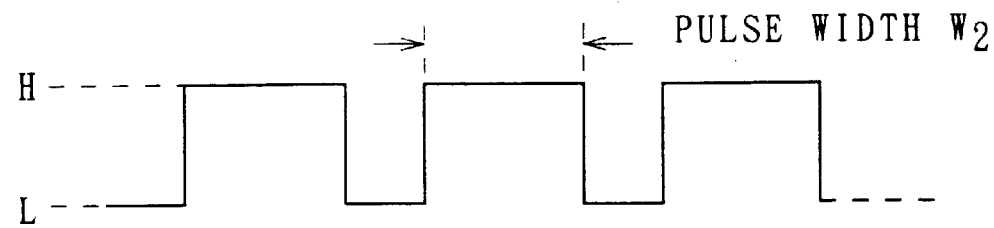

On the other hand, the second pulse width modulator circuit 16 determines from the result of the voltage detection from the voltage detector circuit 13 that an allowable loss is likely to be exceeded when an input voltage above a rated voltage value for the voltage regulating circuit 12 is detected, generates a pulse signal having a desired pulse width $W_2$ according to the input voltage as shown in FIG. 4B, based on a clock signal supplied from the oscillator 17, and supplies the pulse signal to a second control circuit 19. Note that, the pulse width $W_2$ of the pulse signal is set to an optimal value such that a circuit loss of the voltage regulating circuit 12 does not exceed its allowable loss.

Note that, the second pulse width modulator circuit 16 generates a signal fixed at logical level "H" which is supplied to the second control circuit 19 when an input voltage at or below the rated voltage value is detected from the result of the voltage detection from the voltage detector circuit 13.

The second control circuit 19 activates the voltage regulating circuit 12 when a signal supplied from the pulse width modulator circuit 16 is at logical level "H", and deactivates the voltage regulating circuit 12 when at logical level "L". In this way, the voltage regulating circuit 12 is intermittently operated when an input voltage above the rated voltage value is detected, while the voltage regulating circuit 12 is continuously operated when an input voltage at or below the rated voltage value is detected.

Figure 5:
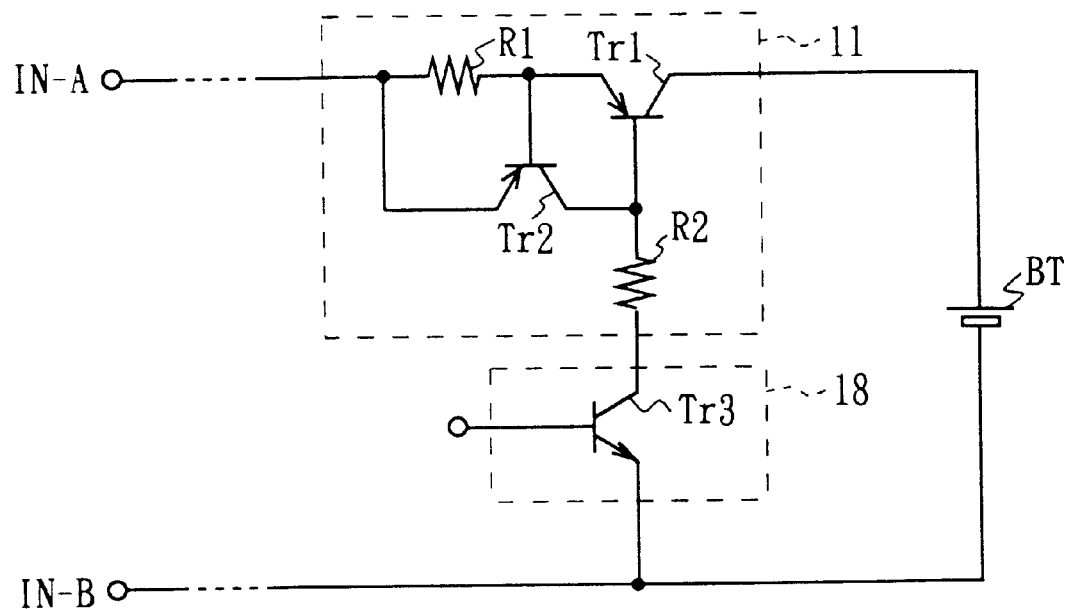
FIG. 5 is a connection diagram showing the configurations of a current regulating circuit and a control circuit.

Now, the respective circuit blocks will be described in terms of their specific configurations. First, the current regulating circuit 11 and the first control circuit 18 will be described with reference to FIG. 5. As shown in FIG. 5, one end of a resistor R1 is connected to an input side of the current regulating circuit 11, and the other end of resistor R1 is connected to an emitter of a transistor Tr1 serving as a switching element. A collector of the transistor Tr1 is connected to an output side of the current regulating circuit 11, and a base is connected to the first control circuit 18 through a resistor R2. Further, one end of the resistor R1 is connected to an emitter of a transistor Tr2 serving as a current detecting element, and the other end of the resistor R1 is connected to a base of the transistor Tr2. Further, a collector of the transistor Tr2 is connected to the base of the transistor Tr1.

In the current regulating circuit 11 having the configuration mentioned above, when the base of the transistor Tr1 is grounded by the first control circuit 18, the transistor Tr1 is turned ON to allow a current to flow from the input side to the output side. When the current increases to a reference value or higher, a predetermined potential difference is generated between the base and the emitter of the transistor Tr2 by the resistor R1, thereby turning the transistor Tr2 ON. When the transistor Tr2 is turned ON, since the transistor Tr1 has a base potential higher than an emitter potential, the transistor Tr1 is turned OFF, therefore the current is prevented from flowing. When no current is flowing, since the transistor Tr2 is again turned OFF to cause the base potential of the transistor Tr1 to decrease below the emitter potential, the transistor Tr1 is turned ON. Subsequently, these operations are repeated to cause the transistor Tr2 to detect a current in order to control the circuit operation, whereby the current regulating circuit 11 outputs a current at or below the reference value.

On the other hand, the first control circuit 18 comprises a transistor Tr3 serving as a switching element. A collector of the transistor Tr3 is connected to the aforementioned resistor R2 of the current regulating circuit 11 and an emitter is grounded. A base of the transistor Tr3 is supplied with a signal from the first pulse width modulator circuit 15, such that the transistor Tr3 is turned ON when the signal is at logical level "H", and the transistor Tr3 is turned OFF when at logical level "L". Therefore, the first control circuit 18 activates the current regulating circuit 11 by grounding the base of the transistor Tr1 of the current regulating circuit 11 when the signal from the first pulse width modulator circuit 15 is at logical level "H", and deactivates the current regulating circuit 11 by separating the base of the transistor Tr1 of the current regulating circuit 11 from the remaining circuit portion when at logical level "L".

Figure 6:
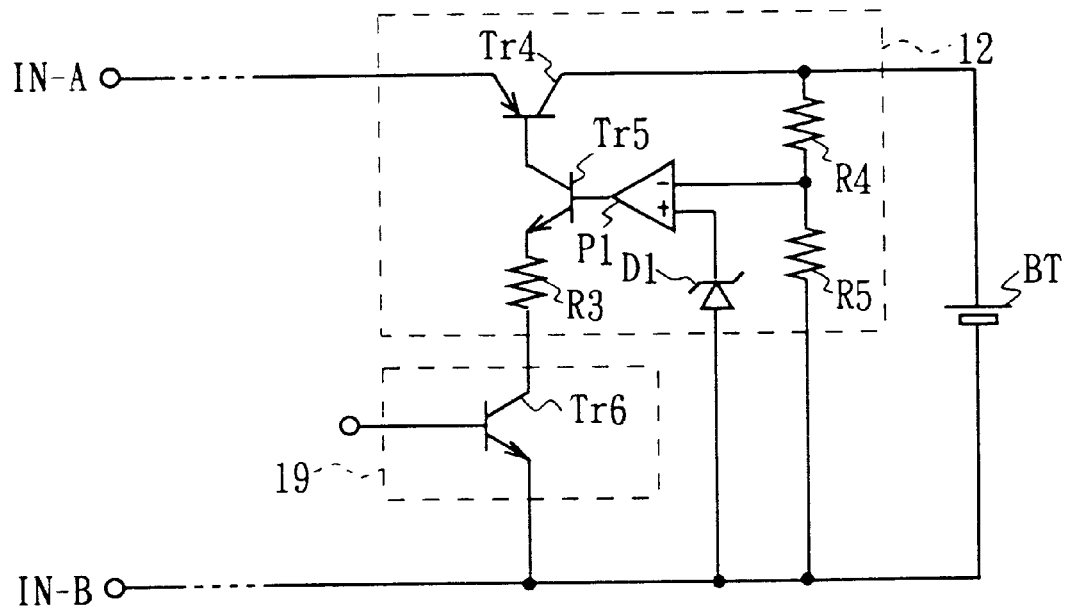
FIG. 6 is a connection diagram showing the configurations of a voltage regulating circuit and the control circuit.

Next, the voltage regulating circuit 12 and the second control circuit 19 will be described with reference to FIG. 6. As shown in FIG. 6, an input side of the voltage regulating circuit 12 is connected to an emitter of a transistor Tr4 serving as a switching element, and a collector of the transistor Tr4 is connected to an output side of the current regulating circuit 12. A base of the transistor Tr4 is connected to a collector of a transistor Tr5 serving as a control element, and an emitter of the transistor Tr5 is connected to the second control circuit 19 through a resistor R3. An output side of the voltage regulating circuit 12 is connected to one end of a resistor R4 serving as a voltage detecting element for detecting an output voltage of the voltage regulating circuit 12, and the other end of the resistor R4 is grounded through a resistor R5. A potential at a median point of the resistors R4 and R5 is a divided output voltage of the voltage regulating circuit 12, and is inputted to a comparator P1 serving as a voltage detecting element. The comparator P1 compares a reference potential generated by a zener diode D1 with the potential at the median point of the resistors R4 and R5 to detect whether or not an output voltage of the voltage regulating circuit 12 is a reference value, and outputs an output signal according to the detection result to a base of the transistor Tr5. Specifically, the comparator P1 outputs an output signal at logical level "H" when the output voltage is at or below the reference value, and outputs an output signal at logical level "L" when above the reference value.

The voltage regulating circuit 12 having the configuration as mentioned above becomes to be an operable state when the emitter of the transistor Tr5 is grounded by the second control circuit 19. Under this state, since the output voltage of the voltage regulating circuit 12 is still below the reference value, the comparator P1 outputs an output signal at logical level "H". Thereby, the transistor Tr5 is turned ON, the base of the transistor Tr4 is grounded, and the transistor Tr4 is turned ON. Thus, a predetermined voltage is outputted to the output side of the voltage regulating circuit 12. The output voltage is divided by the resistors R4 and R5 and then inputted to the comparator P1 to be detected by the comparator P1. As a result, if the output voltage is above the reference value, the comparator P1 outputs an output signal at logical level "L" to turn the transistors Tr5 and Tr4 OFF, thereby preventing a voltage from being outputted to the output side of the voltage regulating circuit 12. When no voltage is outputted, the comparator P1 again outputs an output signal at logical level "H" to turn the transistors Tr4 and Tr5 ON, so that a predetermined voltage is outputted to the output side of the voltage regulating circuit 12. Subsequently, these operations are repeated to detect a voltage with the resistors R4 and R5 and the comparator P1 to control the circuit operation in accordance with the detection result, whereby the voltage regulating circuit 12 outputs a voltage at or below the reference value.

Figure 7:
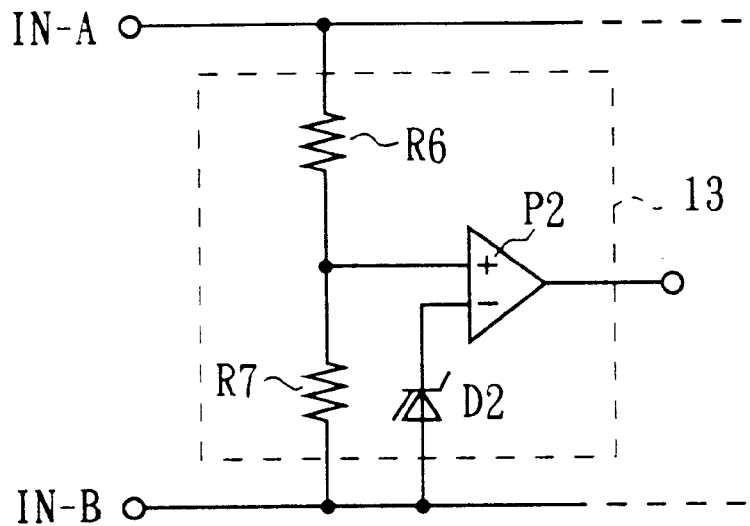
FIG. 7 is a connection diagram showing the configuration of a voltage detector circuit.

On the other hand, the second control circuit 19 comprises a transistor Tr6 serving as a switching element. A collector of the transistor Tr6 is connected to the aforementioned resistor R3 of the voltage regulating circuit 12 and an emitter is grounded. A base of the transistor Tr6 is supplied with a signal from the second pulse width modulator circuit 16, such that the transistor Tr6 is turned ON when the signal is at logical level "H", and the transistor Tr6 is turned OFF when at logical level "L". Therefore, the second control circuit 19 activates the voltage regulating circuit 12 by grounding the emitter of the transistor Tr5 of the voltage regulating circuit 12 when the signal from the second pulse width modulator circuit 16 is at logical level "H", and deactivates the voltage regulating circuit 12 by separating the emitter of the transistor Tr5 of the voltage regulating circuit 12 from the remaining circuit portion when the signal is at logical level "L". Next, the voltage detector circuit 13 will be described with reference to FIG. 7. As shown in FIG. 7, the voltage detector circuit 13 has two resistors R6 and R7 for detecting an input voltage from the direct current power source. One end of the resistor R6 is connected to the input terminal IN-A and the other end is connected to the input terminal IN-B through the resistor R7. A potential at a median point of the resistors R6 and R7 is a divided input voltage from the direct current power source, and is inputted to a comparator P2 for detecting the voltage. The comparator P2 compares a reference potential generated by a zener diode D2 with the potential at the median point of the resistors R6 and R7 to detect whether or not an input voltage from the direct current power source is at or below a rated voltage value, and outputs an output signal according to the detection result. Specifically, the comparator P2 outputs an output signal, for example, at logical level "H" when an input voltage is above the rated voltage value, and outputs an output signal at logical level "L" when the input voltage is at or below the rated voltage value. In this way, the voltage detector circuit 13 detects whether or not an input voltage from the direct current power source is at or below the rated voltage value by comparing the input voltage with the reference potential.

Figure 8:
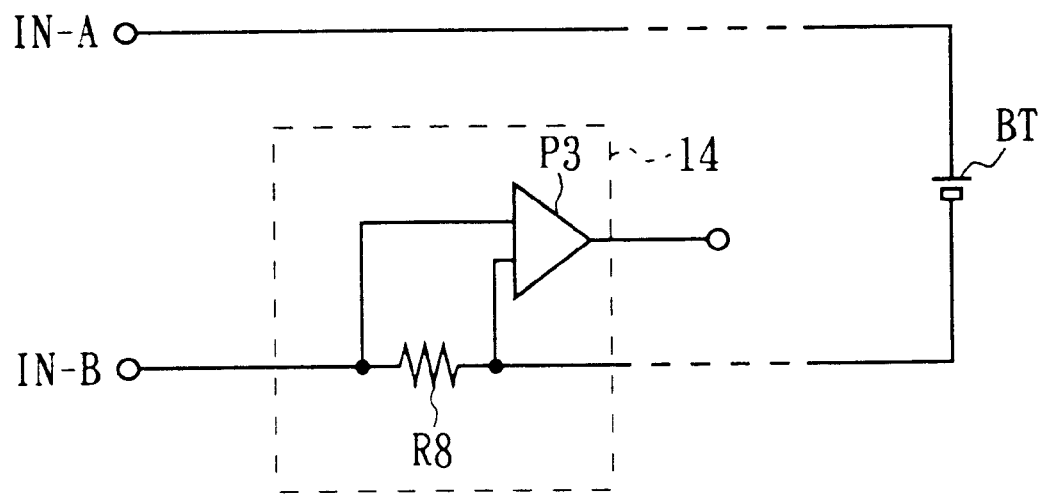
FIG. 8 is a connection diagram showing the configuration of a current detector circuit.

Next, the current detector circuit 14 will be described with reference to FIG. 8. As shown in FIG. 8, the current detector circuit 14 has a resistor R8 for detecting an input current supplied from the direct current power source. One end of the resistor R8 is connected to the input terminal IN-B and the other end is connected to the negative pole of the secondary battery BT. When an input current is supplied from the direct current power source, the input current returns to the direct current power source through the resistor R8, so that a voltage corresponding to the input current is generated in the resistor R8. Potentials generated at both ends of the resistor R8 are inputted to a detector P3 for detecting a current. The detector P3 calculates a voltage generated in the resistor R8 from the inputted potentials at the both ends, and detects an input current flowing through the resistor R8 based on the voltage. As a result, the detector P3 outputs an output signal, for example, at logical level "H" when an input current above a rated current value is flowing, and outputs an output signal at logical level "L" when an input current at or below the rated current value is flowing. In this way, the current detector circuit 14 calculates an input current on the basis of a voltage generated in the resistor R8 to detect whether or not an input current supplied from the direct current power source is at or below the rated current value.

Figure 9:
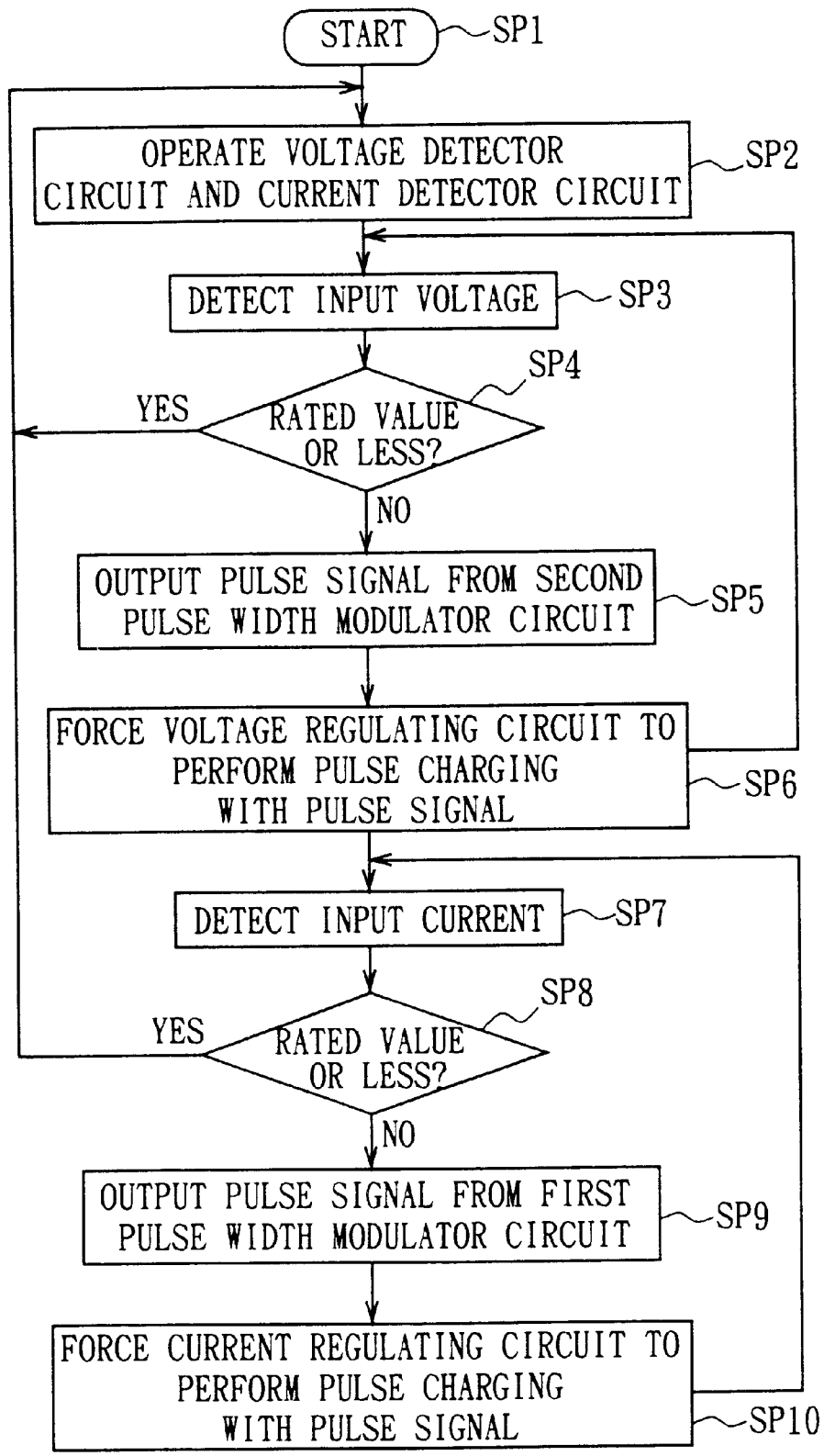
FIG. 9 is a flow chart showing an operational procedure for the battery charger of the first embodiment.

With the foregoing configuration, the battery charger 10 charges the secondary battery BT by executing an operational procedure shown in FIG. 9. Specifically, the operational procedure starts at step SP1, and at step SP2, the current regulating circuit 11 and the voltage regulating circuit 12 are constantly operated to normally charge the secondary battery BT. More specifically, the first pulse width modulator circuit 15 and the second pulse width modulator circuit 16 continuously output signals at logical level "H" to continuously operate the current regulating circuit 11 and the voltage regulating circuit 12.

At next step SP3, a voltage value of an input voltage supplied from the direct current power source is detected by the voltage detector circuit 13. At next step SP4, it is determined, based on the detection result of the voltage detector circuit 13, whether or not the input voltage supplied from the direct current power source is at or below the rated voltage value. If the input voltage is at or below the rated voltage value, the operational procedure returns to step SP2. Conversely, If the input voltage is above the rated voltage value, the operational procedure proceeds to next step SP5. At step SP5, a pulse signal having a desired pulse width is outputted from the second pulse width modulator circuit 16. At next step SP6, the pulse signal causes the voltage regulating circuit 12 to perform the pulse charging. Specifically, the voltage regulating circuit 12 is activated when the pulse signal is at logical level "H", and the voltage regulating circuit 12 is deactivated when the pulse signal is at logical level "L". In this way, the voltage regulating circuit 12 is intermittently operated when an input voltage from the direct current power source is above the rated voltage value, in order to prevent a circuit loss of the voltage regulating circuit 12 from exceeding an allowable loss, thereby making it possible to protect the voltage regulating circuit 12 from damages.

After the processing at step SP6 is executed, the operational procedure once returns to step SP3 to confirm the input voltage. If the input voltage is still above the rated voltage value as before, the operational procedure proceeds to next step SP7. The input voltage is thus confirmed because an input voltage from the direct current power source may be at or below the rated voltage value, for example, when the user may replace the direct current power source with another one for supplying a voltage at or below the rated value.

At next step SP7, a current value of an input current supplied from the direct current power source is detected by the current detector circuit 14. At next step SP8, it is determined, based on the detection result of the current detector circuit 14, whether or not the input current supplied from the direct current power source is at or below a rated current value. If the input current is at or below the rated current value, the operational procedure returns to step SP2 to continue to constantly operate the current regulating circuit 11. Conversely, if the input current is above the rated current value, the operational procedure proceeds to next step SP9. At step SP9, a pulse signal having a desired pulse width is outputted from the first pulse width modulator circuit 15. At next step SP10, the pulse signal causes the current regulating circuit 11 to perform the pulse charging. Specifically, the current regulating circuit 11 is activated when the pulse signal is at logical level "H", and the current regulating circuit 11 is deactivated when the pulse signal is at logical level "L". In this way, the current regulating circuit 11 is intermittently operated when an input current from the direct current power source is above the rated current value, to prevent a circuit loss of the current regulating circuit 11 from exceeding an allowable loss, thereby making it possible to protect the current regulating circuit 11 from damages.

After the processing at step SP10 is executed, the operational procedure returns to step SP7 to confirm the input current, for the same reason as mentioned above. If the input current is still above the rated current value, the processing of the pulse charging is repeated. If the input current is at or below the rated current value, the operational procedure returns to step SP2.

As described above, in the battery charger 10, an input voltage is detected by the voltage detector circuit 13, and the voltage regulating circuit 12 is forced to perform the pulse charging when the input voltage is above the rated voltage value. Thus, when an input voltage is above the rated voltage value, the voltage regulating circuit 12 is intermittently operated to suppress a circuit loss of the voltage regulating circuit 12 and suppress heat generated thereby, thus making it possible to protect the circuit from damages.

Also, an input current is detected by the current detector circuit 14, and the current regulating circuit 11 is forced to perform the pulse charging when the input current is above the rated current value. Thus, when an input current is above the rated current value, the current regulating circuit 11 is intermittently operated to suppress a circuit loss of the current regulating circuit 11 and suppress heat generated thereby, thus making it possible to protect the circuit from damages.

According to the foregoing configuration, the voltage regulating circuit 12 is intermittently operated when an input voltage from the direct current power source is above the rated voltage value, and the current regulating circuit 11 is intermittently operated when an input current from the direct current power source is above the rated current value, so that even if the input voltage and the input current are above their respective rated values, it is possible to suppress heat generated in the voltage regulating circuit 12 and the current regulating circuit 11 and accordingly to protect the voltage regulating circuit 12 and the current regulating circuit 11 from damages. Thus, a battery charger capable of obviating damages in the current regulating circuit and the voltage regulating circuit can be realized.

(3) Second Embodiment

Figure 10:
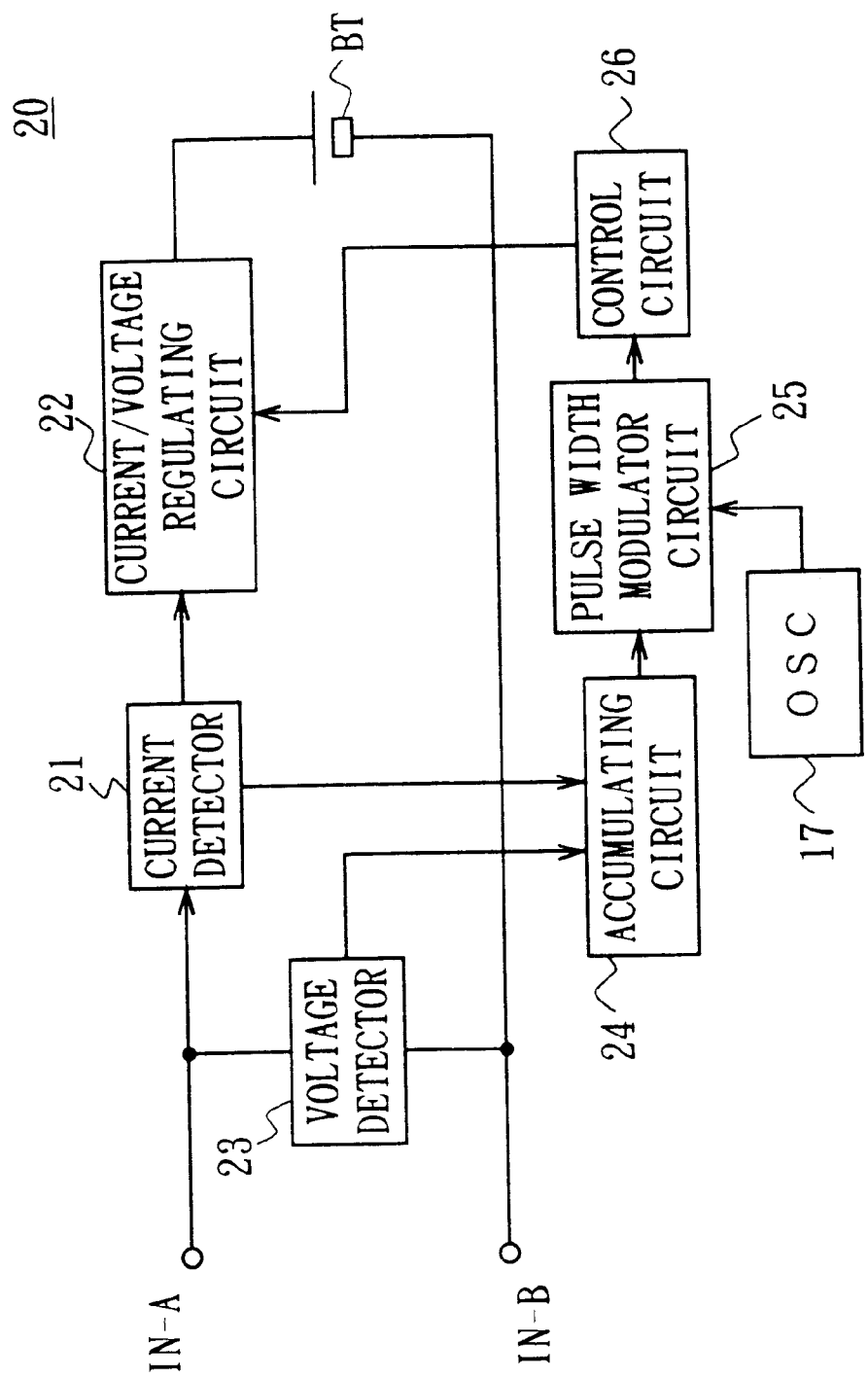
FIG. 10 is a block diagram showing the configuration of a battery charger according to a second embodiment.

In FIG. 10 in which the same reference numerals are applied to parts corresponding to FIG. 3, numeral 20 shows a battery charger according to a second embodiment as a whole. In this embodiment, a direct current power source is likewise connected between input terminals IN-A and IN-B.

In the battery charger 20, two circuits connected in series are arranged between the input terminal IN-A and a positive pole of a secondary battery BT. Specifically, one is a current detector circuit 21 for detecting a current value of an input current supplied from the direct current power source, and the other is a current/voltage regulating circuit 22 for supplying the secondary battery BT with a charging current at or below a rated value for the battery and for supplying the battery BT with a charging voltage at or below a rated value for the battery. By arranging such the current/voltage regulating circuit 22, this embodiment can also prevent a charging current and a charging voltage above their respective rated values for the battery from being supplied to the secondary battery BT, and accordingly protect the secondary battery BT from damages.

Between the input terminals IN-A and IN-B, a voltage detector circuit 23 is also arranged for detecting a voltage value of an input voltage supplied from the direct current power source.

Note that, the current detection result and the voltage detection result respectively detected by the current detector circuit 21 and the voltage detector circuit 23 are respectively outputted to an accumulating circuit 24.

The accumulating circuit 24 accumulates the current detection result supplied from the current detector circuit 21 and the voltage detection result supplied from the voltage detector circuit 23 to calculate input power supplied from the direct current power source and then outputs the power calculation result to a pulse width modulator circuit 25.

The pulse width modulator circuit 25 generates a pulse signal having a desired pulse width according to the detected input power based on a clock signal supplied from an oscillator 17, when it is determined from the power calculation result supplied from the accumulating circuit 24 that input power above a rated power value is being supplied from the direct current power source, and then outputs the pulse signal to a control circuit 26. In this connection, the pulse width of the pulse signal is set to an optimal value such that a circuit loss of the current/voltage regulating circuit 22 does not exceed an allowable loss.

Note that, if it is determined from the power calculation result supplied from the accumulating circuit 24 that input power at or below the rated power value is being supplied from the direct current power source, the pulse width modulator circuit 25 always generates a signal at logical level "H" which is supplied to the control circuit 26.

The control circuit 26 activates the current/voltage regulating circuit 22 when the signal supplied from the pulse width modulator circuit 25 is at logical level "H", and deactivates the current/voltage regulating circuit 22 when at logical level "L". In this way, the current/voltage regulating circuit 22 is intermittently operated when input power above the rated power value is supplied from the direct current power source, while the current/voltage regulating circuit 22 is continuously operated when the input power at or below the rated power value is supplied.

Figure 11:
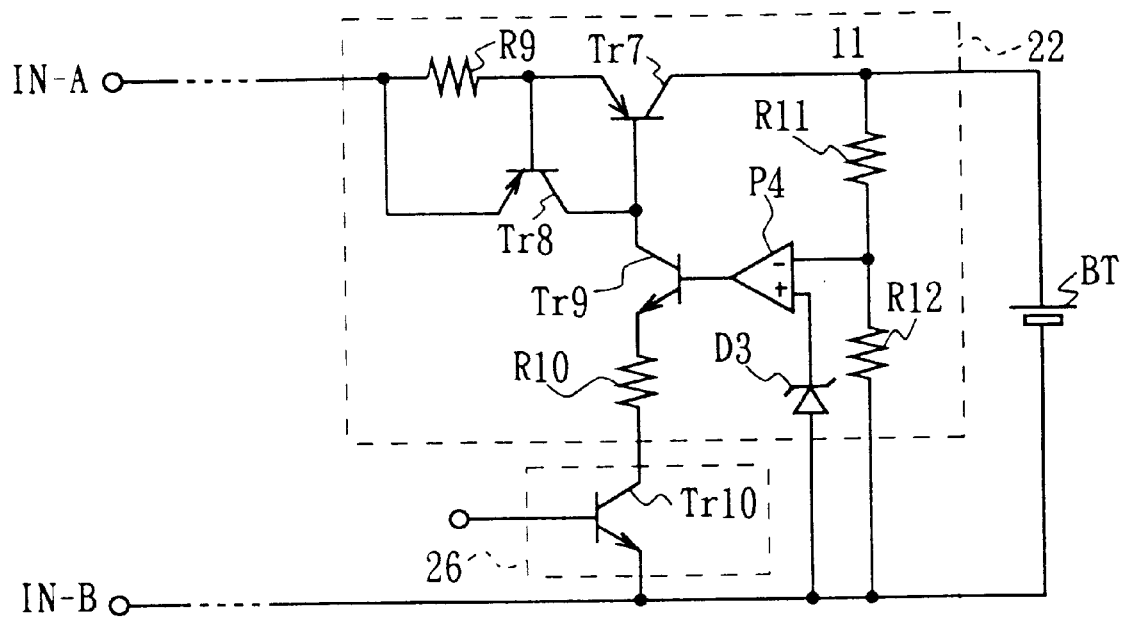
FIG. 11 is a connection diagram showing the configuration of a current/voltage regulating circuit.

Now, the current/voltage regulating circuit 22 and the control circuit 26 will be described in terms of their specific configurations with reference to FIG. 11. As shown in FIG. 11, the current/voltage regulating circuit 22 has a configuration equivalent to a combination of the current regulating circuit 11 and the voltage regulating circuit 12 shown in FIGS. 5 and 6 by commonly using a transistor serving as a switching element. More specifically, an input side of the current/voltage regulating circuit 22 is connected to one end of a resistor R9, and the other end of the resistor R9 is connected to an emitter of a transistor Tr7 serving as a switching element. A collector of the transistor Tr7 is connected to an output side of the current/voltage regulating circuit 22 and a base is connected to a collector of the transistor Tr9 serving as a control element.

One end of the resistor R9 is connected to an emitter of a transistor Tr8 serving as a current detecting element, and the other end of the resistor R9 is connected to a base of the transistor Tr8. A collector of the transistor Tr8 is connected to the base of the transistor Tr7 and to the collector of the transistor Tr9.

The output side of the current/voltage regulating circuit 22 is connected to one end of a resistor R11 serving as a voltage detecting element for detecting an output voltage of the current/voltage regulating circuit 22, and the other end of the resistor R1 is grounded through a resistor R12. A potential at a median point of the resistors R11 and R12 is a divided output voltage of the current/voltage regulating circuit 22, and is inputted to a comparator P4 serving as a voltage detecting element. The comparator P4 compares a reference potential generated by a zener diode D3 with the potential at the median point of the resistors R11 and R12 to detect whether or not an output voltage of the current/voltage regulating circuit 22 is a reference value, and outputs an output signal according to the detection result to the base of the transistor Tr9. Specifically, the comparator P4 outputs an output signal at logical level "H" when the output voltage is at or below the reference value, and outputs an output signal at logical level "L" when above the reference value.

The emitter of the transistor TR9, which is supplied with the output signal, is connected to the control circuit 26 through a resistor R10.

The current/voltage regulating circuit 22 having the configuration as mentioned above becomes to be an operable state when the emitter of the transistor Tr9 is grounded by the control circuit 26. Under this state, since the output voltage of the current/voltage regulating circuit 22 is still below the reference value, the comparator P4 outputs an output signal at logical level "H". Thereby, the transistor Tr9 is turned ON, the base of the transistor Tr7 is grounded, and the transistor Tr7 is turned ON. Thus, a predetermined voltage and a predetermined current are outputted to the output side of the current/voltage regulating circuit 22. The output voltage is divided by the resistors R11 and R12, and then inputted to the comparator P4 and detected by the comparator P4. As a result, if the output voltage is above the reference value, the comparator P4 outputs an output signal at logical level "L" to turn the transistors Tr9 and Tr7 OFF, thereby preventing a voltage from being outputted to the output side of the current/voltage regulating circuit 22. When no voltage is outputted, the comparator P4 again outputs an output signal at logical level "H" to turn the transistors Tr9 and Tr7 ON, so that a predetermined voltage is outputted to the output side of the current/voltage regulating circuit 22. Subsequently, these operations are repeated to detect a voltage with the resistors R11 and R12 and the comparator P4 and to control the circuit operation in accordance with the detection result, whereby the current/voltage regulating circuit 22 outputs a voltage at or below the reference value.

When the transistor Tr7 turns ON to allow a current to flow through the resistor R9 and the current increases to the reference value or higher, a predetermined potential difference is generated between the base and the emitter of the transistor Tr8 by the resistor R9, thereby turning the transistor Tr8 ON. With the transistor Tr8 turned ON, the transistor Tr7 has a base potential above an emitter potential to turn the transistor Tr7 OFF to prevent the current from flowing. When no current is flowing, the transistor Tr8 is again turned OFF to cause the base potential of the transistor Tr7 to decrease below the emitter potential, and the transistor Tr7 is turned ON. Subsequently, these operations are repeated to force the transistor Tr8 to detect a current in order to control the circuit operation, whereby the current/voltage regulating circuit 22 outputs a current at or below the reference value.

On the other hand, the control circuit 26 comprises a transistor Tr10 serving as a switching element in a manner similar to the first embodiment. A collector of the transistor Tr10 is connected to the aforementioned resistor R10 of the current/voltage regulating circuit 22, and an emitter is grounded. A base of the transistor Tr10 is supplied with a signal from the pulse width modulator circuit 25, such that the transistor Tr10 is turned ON when the signal is at logical level "H", and the transistor Tr10 is turned OFF when at logical level "L". In this way, the control circuit 26 activates the current/voltage regulating circuit 22 by grounding the emitter of the transistor Tr9 of the current/voltage regulating circuit 22 when the signal from the pulse width modulator circuit 25 is at logical level "H", and deactivates the current/voltage regulating circuit 22 by separating the emitter of the transistor Tr9 of the current/voltage regulating circuit 22 from the remaining circuit portion when the signal is at logical low "L".

Figure 12:
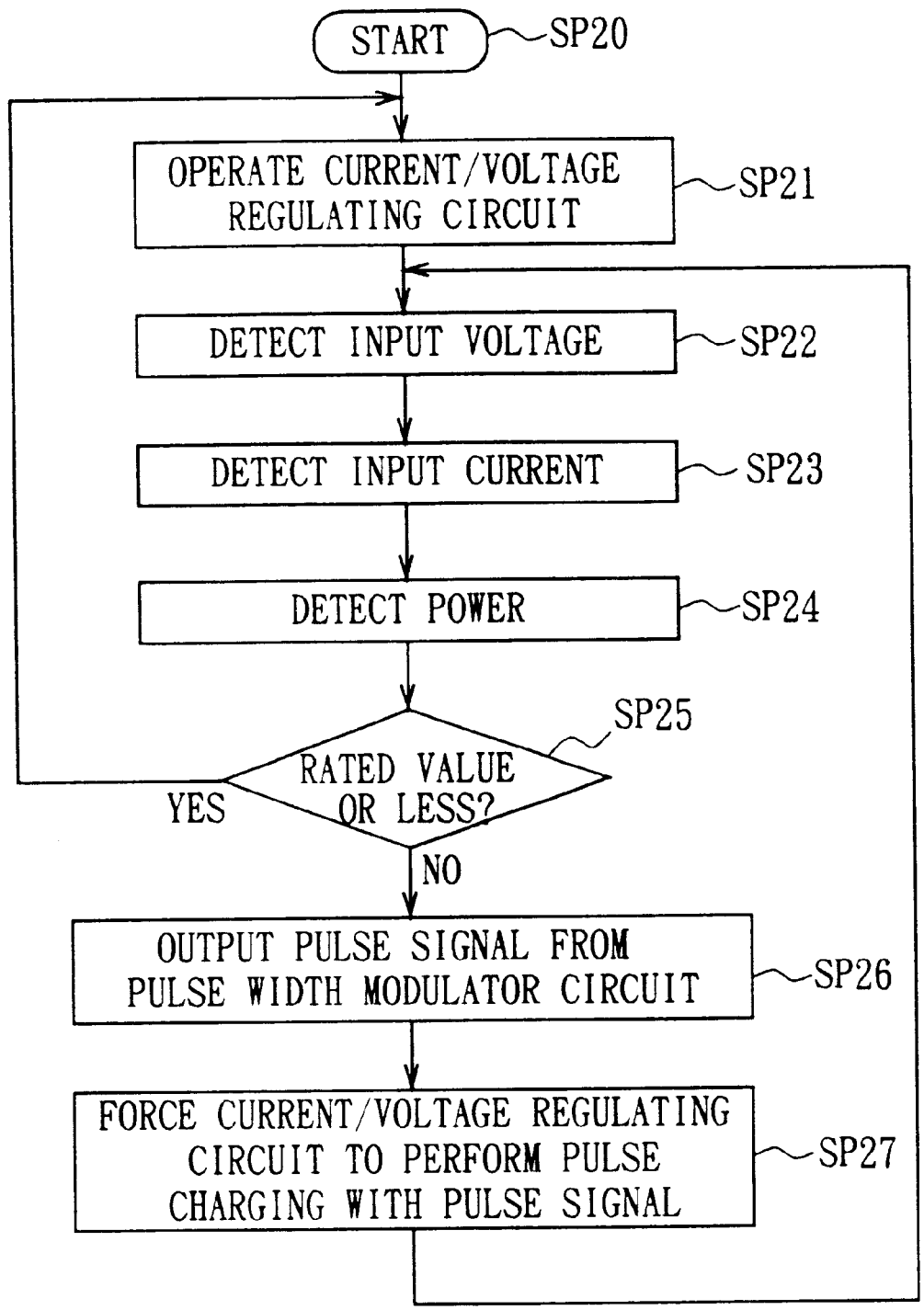
FIG. 12 is a flow chart showing an operational procedure for the battery charger according to the second embodiment.

With the foregoing configuration, the battery charger 20 charges the secondary battery BT by executing an operational procedure shown in FIG. 12. Specifically, the operational procedure starts at step SP20, and at step SP21, the current/voltage regulating circuit 22 is continuously operated to normally charge the secondary battery BT. More specifically, the pulse width modulator circuit 25 outputs signals fixed at logical level "H" to continuously operate the current/voltage regulating circuit 22.

At next step S22, a voltage value of an input voltage supplied from the direct current power source is detected by the voltage detector circuit 23. At next step S23, a current value of an input current supplied from the direct current power source is detected by the current detector circuit 21. At next step SP24, the detected voltage value and current value are accumulated by the accumulating circuit 24 to calculate input power supplied from the direct current power source. At next step SP25, it is determined whether or not the calculated input power is at or below a rated power value. The operational procedure returns to step SP21 when the calculated input power is at or below the rated power value, and proceeds to next step SP26 when it is above the rated power value.

At step SP26, a pulse signal having a desired pulse width is outputted from the pulse width modulator circuit 25 based on the calculated input power. At next step SP27, the pulse signal causes the current/voltage regulating circuit 22 to perform the pulse charging. Specifically, the current/voltage regulating circuit 22 is activated when the pulse signal is at logical level "H", and the current/voltage regulating circuit 22 is deactivated when the pulse signal is at logical level "L". In this way, the current/voltage regulating circuit 22 is intermittently operated when input power above the rated power value is supplied from the direct current power source, to prevent a circuit loss of the current/voltage regulating circuit 22 from exceeding an allowable loss, thereby making it possible to protect the current/voltage regulating circuit 22 from damages.

After the processing at step SP27 is executed, the operational procedure once returns to step SP22 to confirm the input power. The processing for the pulse charging is repeated if the input power is still above the rated power value, and the operational procedure returns to step SP21 if the input power has been reduced to the rated power value or lower. The input power is thus confirmed because the input power supplied from the direct current power source may be decreased to the rated voltage value or lower due to a decrease of input current or the like.

As described above, in the battery charger 20, an input voltage and an input current are detected by the voltage detector circuit 23 and the current detector circuit 21 respectively, to calculate input power based on the voltage value and the current value. Then, the current/voltage regulating circuit 22 is forced to perform the pulse charging when the input power is above the rated power value. Thus, even if input power supplied from the direct current power source is above the rated power value, the current/voltage regulating circuit 22 is intermittently operated to suppress a circuit loss of the current/the voltage regulating circuit 22 and suppress heat generated thereby, thus making it possible to protect the circuit from damages.

According to the foregoing configuration, the current/voltage regulating circuit 22 is intermittently operated when input power from the direct current power source is above the rated power value, so that even if the input power from the direct current power source is above the rated power value, it is possible to suppress heat generated in the current/voltage regulating circuit 22 and accordingly to protect the current/voltage regulating circuit 22 from damages. In this way, a battery charger capable of obviating damages in a current/voltage regulating circuit can be realized.

(4) Third Embodiment

Figure 13:
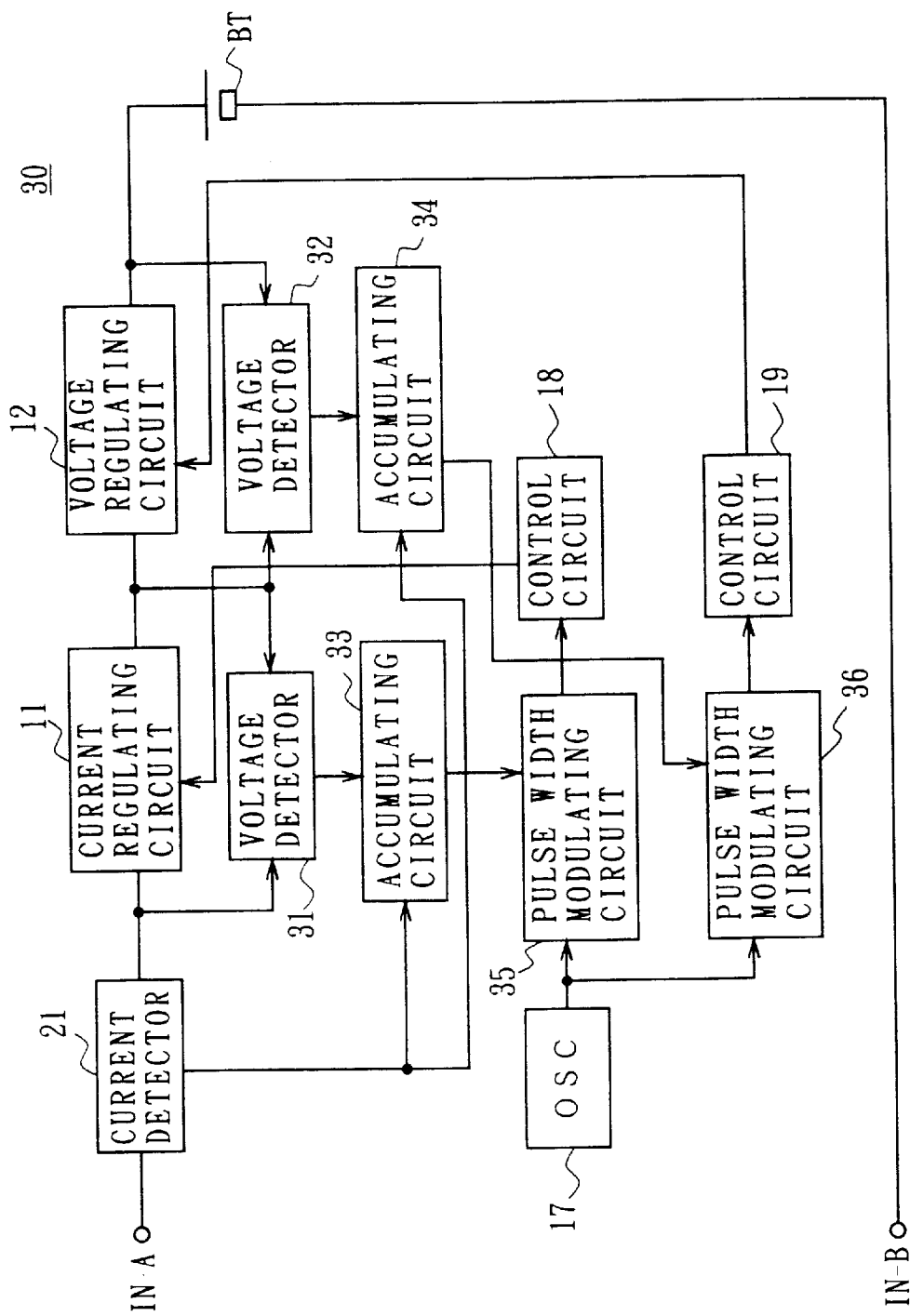
FIG. 13 is a block diagram showing the configuration of a battery charger according to a third embodiment.

In FIG. 13 in which the same reference numerals are applied to parts corresponding to FIGS. 3 and 10, numeral 30 shows a battery charger according to a third embodiment as a whole. In this embodiment, power of a current regulating circuit 11 and a voltage regulating circuit 12 is detected to control the pulse charging.

First, in the battery charger 30, three circuits connected in series are arranged between an input terminal IN-A and the positive pole of a secondary battery BT. Specifically, one is a current detector circuit 21 for detecting a current value of an input current supplied from a direct current power source; another one is the current regulating circuit 11 for supplying the secondary battery BT with a charging current at or below a rated value for the battery; and the remaining one is the voltage regulating circuit 12 for supplying the secondary battery BT with a charging voltage at or below a rated value for the battery. By thus arranging the current regulating circuit 11 and the voltage regulating circuit 12, this embodiment can also prevent the secondary battery BT from being supplied with a charging current and a charging voltage above their respective rated values for the battery, and accordingly protect the secondary battery BT from damages.

Also, the battery charger 30 is provided with first and second voltage detector circuits 31 and 32 for detecting a potential difference between inputs and outputs of the current regulating circuit 11 and the voltage regulating circuit 12. The first voltage detector circuit 31, which is a circuit for detecting a potential difference between the input and the output of the current regulating circuit 11, fetches a potential on the input side of the current regulating circuit 11 and a potential on the output side of the current regulating circuit 11, and obtains a potential difference therebetween to calculate a potential difference between the input and the output of the current regulating circuit 11. In this connection, the potential difference of the current regulating circuit 11 is outputted to a first accumulating circuit 33 described later.

On the other hand, the second voltage detector circuit 32, which is a circuit for detecting a potential difference between the input and the output of the voltage regulating circuit 12, fetches a potential on the input side of the voltage regulating circuit 12 and a potential on the output side of the voltage regulating circuit 12, and obtains a potential difference therebetween to calculate a potential difference between the input and the output of the voltage regulating circuit 12. In this connection, the potential difference of the voltage regulating circuit 12 is outputted to a second accumulating circuit 34 described later.

The first accumulating circuit 33, which is a circuit for calculating the power of the current regulating circuit 11, accumulates an input current detected by the current detector circuit 21 and the potential difference between the input and the output of the current regulating circuit 11 detected by the first voltage detector circuit 31, to calculate the power of the current regulating circuit 11, and outputs the power calculation result to a first pulse width modulator circuit 35.

Further, the second accumulating circuit 34, which is a circuit for calculating the power of the voltage regulating circuit 12, accumulates an input current detected by the current detector circuit 21 and the potential difference between the input and the output of the voltage regulating circuit 12 detected by the second voltage detector circuit 32, to calculate the power of the voltage regulating circuit 12, and outputs the power calculation result to a second pulse width modulator circuit 36.

The first pulse width modulator circuit 35 generates a pulse signal having a desired pulse width according to the detected power based on a clock signal supplied from an oscillator 17, when it is determined from the power calculation result supplied from the first accumulating circuit 33 that the power of the current regulating circuit 11 is above a rated power value, and outputs the pulse signal to a first control circuit 18. In this connection, the pulse width of the pulse signal is set to an optimal value such that a circuit loss of the current regulating circuit 11 does not exceed an allowable loss.

Note that, the first pulse width modulator circuit 35 continuously generates a signal at logical level "H" and supplies the signal to the first control circuit 18 when it is determined from the power calculation result supplied from the first accumulating circuit 33 that the power of the current regulating circuit 11 is at or below the rated power value.

On the other hand, the second pulse width modulator circuit 36 generates a pulse signal having a desired pulse width according to the detected power based on a clock signal supplied from the oscillator 17 and outputs the pulse signal to a second control circuit 19, when it is determined from the power calculation result supplied from the second accumulating circuit 34 that the power of the voltage regulating circuit 12 is above the rated power value. In this connection, the pulse width of the pulse signal is set to an optimal value such that a circuit loss of the voltage regulating circuit 12 does not exceed an allowable loss.

Note that, the second pulse width modulator circuit 36 generates a signal fixed at logical level "H" and supplies the signal to the second control circuit 19 when it is determined from the power calculation result supplied from the second accumulating circuit 34 that the power of the voltage regulating circuit 12 is at or below the rated power value.

The first control circuit 18 activates the current regulating circuit 11 when the signal supplied from the first pulse width modulator circuit 35 is at logical level "H", and deactivates the current regulating circuit 11 when at logical level "L". In this way, the current regulating circuit 11 is intermittently operated when the power is above the rated power value, and the current regulating circuit 11 is continuously operated when the power is at or below the rated power value.

Further, the second control circuit 19 activates the voltage regulating circuit 12 when the signal supplied from the second pulse width modulator circuit 36 is at logical level "H", and deactivates the voltage regulating circuit 12 when at logical level "L". In this way, the voltage regulating circuit 12 is intermittently operated when the power is above the rated power value, and the voltage regulating circuit 12 is continuously operated when the power is at or below the rated power value.

In the battery charger 30 configured as described above, a potential difference between the input and output of the current regulating circuit 11 is detected by the first voltage detector circuit 31, and the power of the current regulating circuit 11 is directly calculated based on the potential difference and an input current detected by the current detector circuit 21. Then, when the power of the current regulating circuit 11 is above the rated power value, the first pulse width modulator circuit 35 outputs a pulse signal having a desired pulse width to intermittently operate the current regulating circuit 11. In this way, when the power of the current regulating circuit 11 is above the rated power value, the current regulating circuit 11 is intermittently operated to reduce the power of the current regulating circuit 11 to the rated power value or lower (in other words, to suppress a circuit loss of the current regulating circuit 11 and suppress heat generated thereby), thus making it possible to protect the circuit from damages.

Also, in the battery charger 30, a potential difference between the input and the output of the voltage regulating circuit 12 is detected by the second voltage detector circuit 32, and the power of the voltage regulating circuit 12 is directly calculated based on the potential difference and an input current detected by the current detector circuit 21. Then, when the power of the voltage regulating circuit 12 is above the rated power vale, the second pulse width modulator circuit 12 outputs a pulse signal having a desired pulse width to intermittently operate the voltage regulating circuit 12. In this way, when the power of the voltage regulating circuit 12 is above the rated power value, the voltage regulating circuit 12 is intermittently operated to reduce the power of the voltage regulating circuit 12 to the rated power value or lower (in other words, to suppress a circuit loss of the voltage regulating circuit 12 and suppress heat generated thereby), thus making it possible to protect the circuit from damages.

According to the foregoing configuration, the current regulating circuit 11 is intermittently operated when the power of the current regulating circuit 11 is above the rated power value, while the voltage regulating circuit 12 is intermittently operated when the power of the voltage regulating circuit 12 is above the rated power value, so that it is possible to suppress heat generated in the current regulating circuit 11 and the voltage regulating circuit 12 and accordingly to protect the current regulating circuit 11 and the voltage regulating circuit 12 from damages. Thus, a battery charger capable of obviating damages in the current regulating circuit and the voltage regulating circuit can be realized.

(5) Fourth Embodiment

Figure 14:
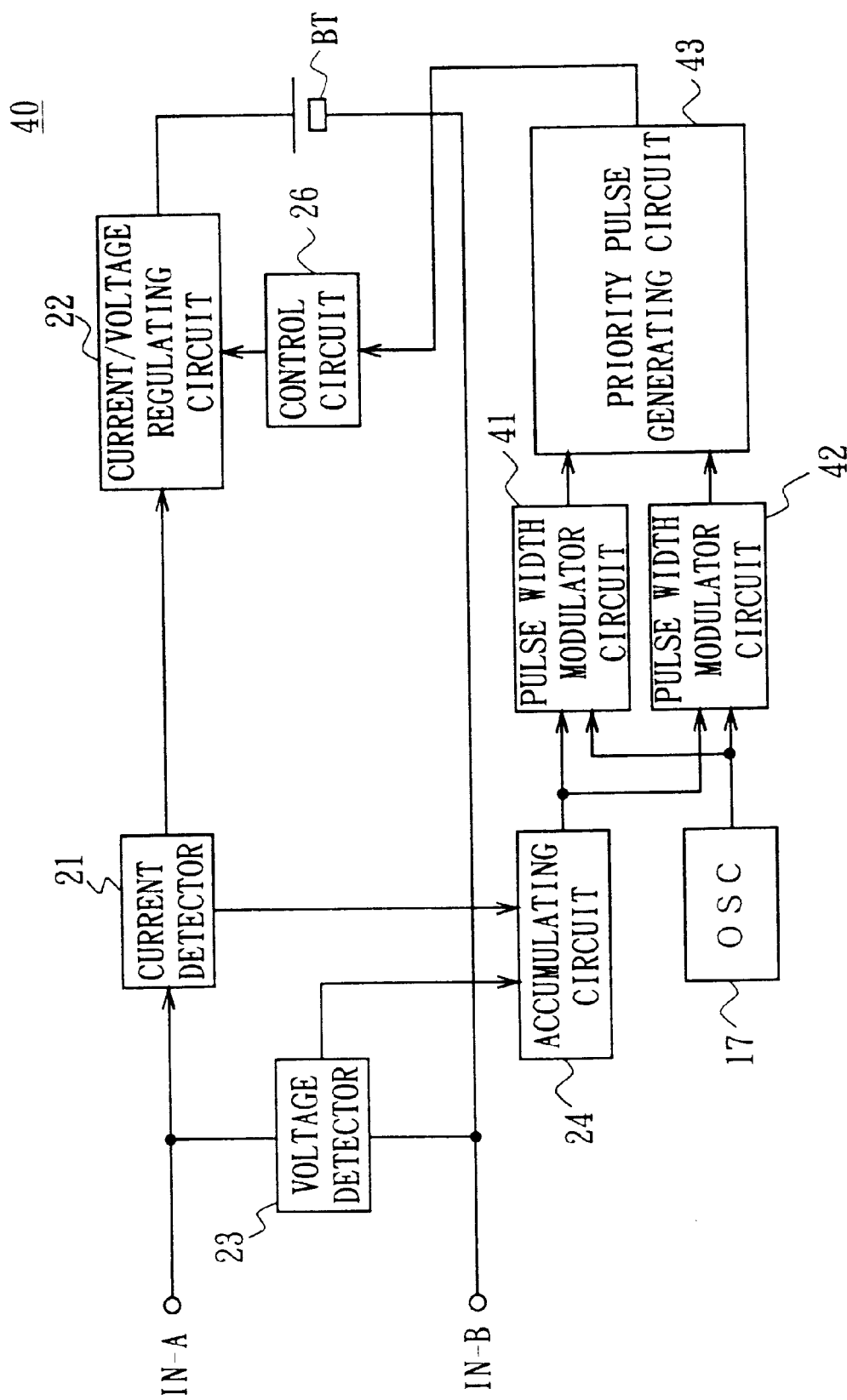
FIG. 14 is a block diagram showing the configuration of a battery charger according to a fourth embodiment.

In FIG. 14 in which the same reference numerals are applied to parts corresponding to FIG. 10, numeral 40 shows a battery charger according to a fourth embodiment as a whole. In this embodiment, a priority pulse signal is generated to control a current/voltage regulating circuit 22.

First, also in the battery charger 40, a current value of an input current detected by a current detector circuit 21 and a voltage value of an input voltage detected by a voltage detector circuit 23 are respectively supplied to an accumulating circuit 24.

The accumulating circuit 24 accumulates the current value and the voltage value, to calculate input power supplied from a direct current power source, and outputs the power calculation result to first and second pulse width modulator circuits 41 and 42.

Figure 15A:
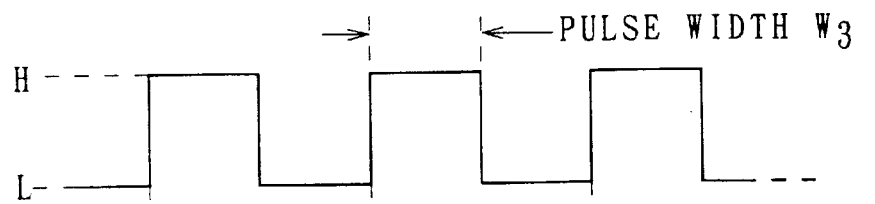
FIGS. 15A, 15B, and 15C are signal waveform charts showing a pulse signal generated by each pulse width modulator circuit and a priority pulse signal generated by a priority pulse generating circuit.

The first pulse width modulator circuit 41 generates a pulse signal having a desired pulse width $W_3$ according to the detected input power, as shown in FIG. 15A, based on a clock signal supplied from an oscillator 17, and outputs the pulse signal to a priority pulse generating circuit 43, when it is determined from the power calculation result supplied from the accumulating circuit 24 that the input power above a rated power value is supplied from the direct current power source. In this connection, the pulse signal is for controlling a current regulating circuit portion within the current/voltage regulating circuit 22, and its pulse width is set to an optimal value such that a circuit loss of the current regulating circuit portion does not exceeds an allowable loss.

Note that, the first pulse width modulator circuit 41 generates a signal fixed at logical level "H" and outputs the signal to the priority pulse generating circuit 43 when it is determined from the power calculation result supplied from the accumulating circuit 24 that input power at or below the rated power value is supplied from the direct current power source.

Figure 15B:
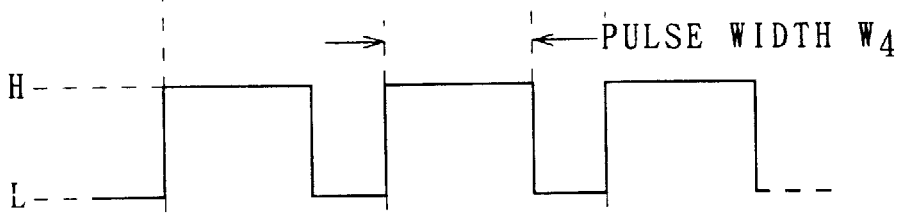

On the other hand, the second pulse width modulator circuit 42 generates a pulse signal having a desired pulse width $W_4$ according to the detected input power, as shown in FIG. 15B, based on a clock signal supplied from the oscillator 17, and outputs the pulse signal to the priority pulse generating circuit 43, when it is determined from the power calculation result supplied from the accumulating circuit 24 that the input power above the rated power value is supplied from the direct current power source. In this connection, the pulse signal is for controlling a voltage regulating circuit portion within the current/voltage regulating circuit 22, and its pulse width is set to an optimal value such that a circuit loss of the voltage regulating circuit portion does not exceeds an allowable loss.

Note that, the second pulse width modulator circuit 42 generates a signal fixed at logical level "H" and outputs the signal to the priority pulse generating circuit 43 when it is determined from the power calculation result supplied from the accumulating circuit 24 that input power at or below the rated power value is supplied from the direct current power source.

As shown in FIGS. 15A and 15B, the pulse signal outputted from the first pulse width modulator circuit 41 for controlling the current regulating circuit portion and the pulse signal outputted from the second pulse width modulator circuit 42 for controlling the voltage regulating circuit portion are in synchronism with each other but have different pulse widths from each other. This is because the current regulating circuit portion and the voltage regulating circuit portion have difference circuit losses. In this example, the first pulse width modulator circuit 41 outputs a pulse having a narrower pulse width, which indicates that the current regulating circuit portion has a larger circuit loss and cannot be operated for a longer time period than the voltage regulating circuit portion.

When the respective circuit portions have difference circuit losses as mentioned above, the operations must be controlled in favor of the portion having the larger circuit loss. This is because if the operations were controlled in favor of the portion having the smaller circuit loss, the circuit portion having the larger circuit loss would exceed an allowable loss and would be damaged.

Figure 15C:
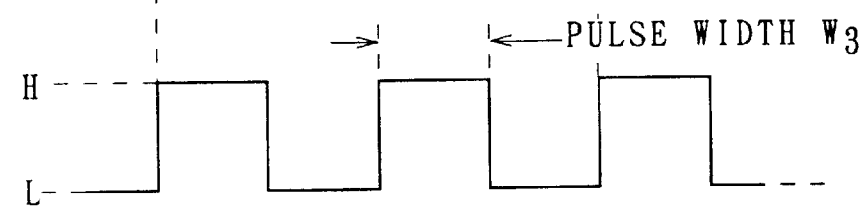

To solve this problem, this embodiment comprises the priority pulse generating circuit 43 so as to select a pulse having a narrower pulse width out of two pulses. More specifically, as shown in FIG. 15C, the priority pulse generating circuit 43 selects a pulse signal having a narrower pulse width out of pulse signals outputted from the first and second pulse width modulator circuits 41 and 42 respectively and outputs the pulse signal to a control circuit 26 as a priority pulse.

The control circuit 26 controls the operation of the current/voltage regulating circuit 22 based on the priority pulse signal outputted from the priority pulse generating circuit 43. Specifically, the current/voltage regulating circuit 22 is activated when the priority pulse signal is at logical level "H", and is deactivated when the priority pulse signal is at logical level "L".

In the battery charger 40 configured as described above, input power supplied from the direct current power source is calculated based on an input current detected by the current detector circuit 21 and an input voltage detected by the voltage detector circuit 23. The first pulse width modulator circuit 41 generates a pulse signal for controlling the current regulating circuit portion within the current/voltage regulating circuit 22 when the calculated input power is above the rated power value. Further, the second pulse width modulator circuit 42 generates a pulse signal for controlling the voltage regulating circuit portion within the current/voltage regulating circuit 22 when the calculated input power is above the rated power value. The priority pulse generating circuit 43 selects one pulse signal having the narrower pulse width out of the two pulse signals, and outputs the pulse signal to the control circuit 26 as the priority pulse signal. The control circuit 26 controls the operation of the current/voltage regulating circuit 22 based on the priority pulse signal to charge the secondary battery BT in the pulse charging manner.

In this way, the battery charger 40 selects a pulse signal having a narrower pulse width out of a pulse signal for the current regulating circuit portion and a pulse signal for the voltage regulating circuit portion, and controls the operation of the current/voltage regulating circuit 22 based on the selected pulse signal (that is, the priority pulse signal), so that the current/voltage regulating circuit 22 can be protected from damages by simultaneously suppressing circuit losses of the current regulating circuit portion and the voltage regulating circuit portion even if the current regulating circuit portion and the voltage regulating circuit portion have different circuit losses from each other.

According to the foregoing configuration, since the operation of the current/voltage regulating circuit 22 is controlled based on a pulse signal having a narrower pulse width out of a pulse signal for controlling the operation of the current regulating circuit portion and a pulse signal for controlling the operation of the voltage regulating circuit portion, the current/voltage regulating circuit 22 can be protected from damages even if the current regulating circuit portion and the voltage regulating circuit portion have different circuit losses from each other.

(6) Fifth Embodiment

Figure 16:
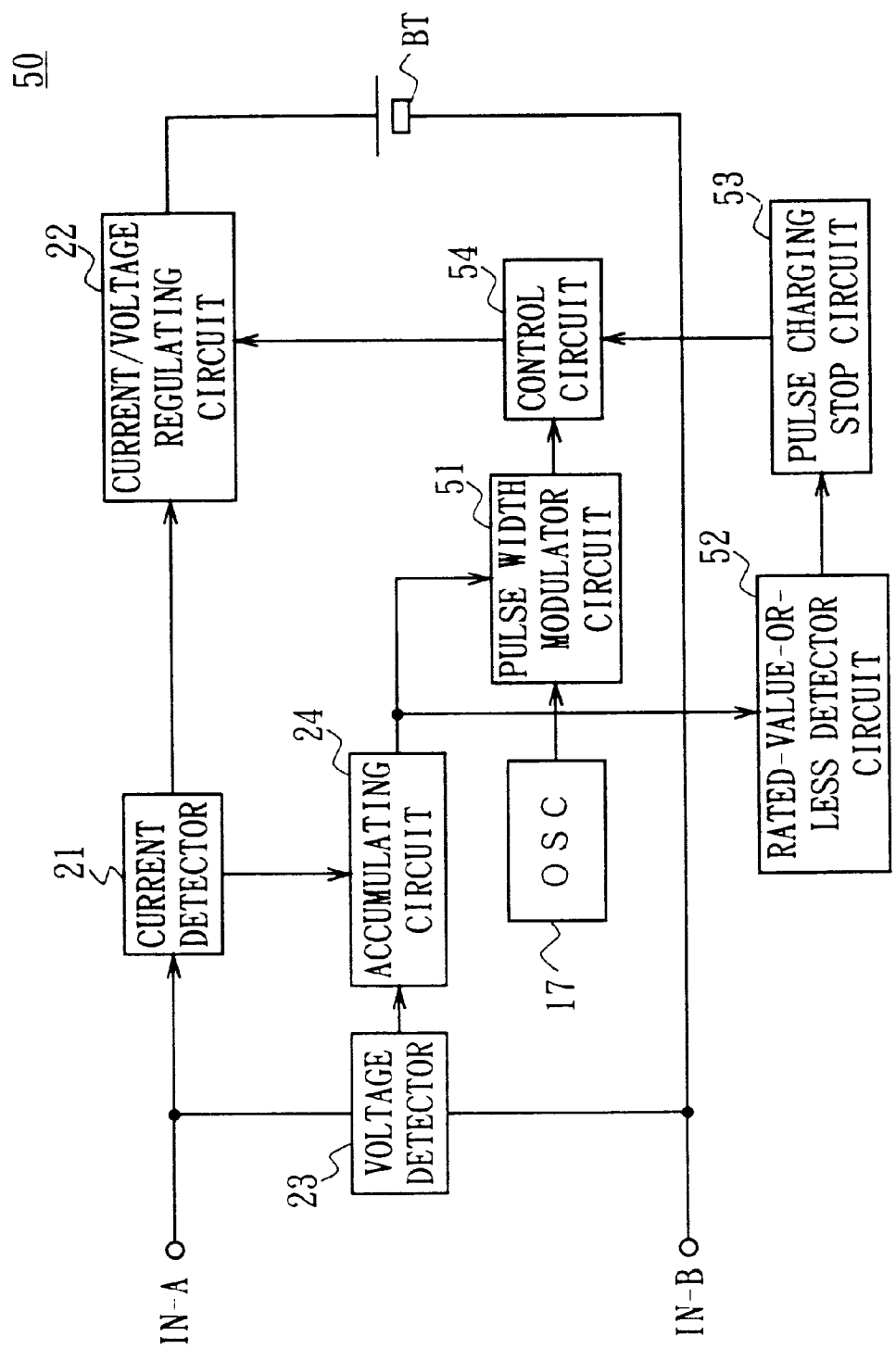
FIG. 16 is a block diagram showing the configuration of a battery charger according to a fifth embodiment.

In FIG. 16 in which the same reference numerals are applied to parts corresponding to FIG. 10, numeral 50 shows a battery charger according to a fifth embodiment as a whole. This embodiment comprises a rated-value-or-less detector circuit 52 and a pulse charging stop circuit 53 such that the pulse charging is stopped when input power supplied from a direct current power source is at or below a rated value.

First, in the battery charger 50, a power calculation result of input power calculated by an accumulating circuit 24 is supplied to a pulse width modulator circuit 51 and the rated-value-or-less detector circuit 52.

The rated-value-or-less detector circuit 52 determines based on the power calculation result supplied from the accumulating circuit 24 whether or not input power supplied from the direct current power source is at or below a rated power value, and outputs rated-value-or-less information indicating the input power at or below the rated power value to the pulse charging stop circuit 53 if the input power is at or below the rated power value. The pulse charging stop circuit 53 outputs a control signal for stopping the pulse charging to a control circuit 54 based on the rated-value-or-less information.

The pulse width modulator circuit 51 generates a pulse signal having a desired pulse width according to the detected input power based on a clock signal supplied from an oscillator 17, and outputs the pulse signal to the control circuit 54.

The control circuit 54 activates the current/voltage regulating circuit 22 when the pulse signal from the pulse width modulator circuit 51 is at logical level "H", and deactivates the current/voltage regulating circuit 22 when at logical level "L". In this way, when input power at or above the rated power value is supplied from the direct current power source, the current/voltage regulating circuit 22 is intermittently operated in accordance with the pulse signal to charge a secondary battery BT in the pulse charging manner. Also, the control circuit 54, upon receiving the control signal for stopping the pulse charging from the pulse charging stop circuit 53, overrides the pulse signal and continuously operates the current/voltage regulating circuit 22. In this way, when input power at or below the rated power value is supplied from the direct current power source, the pulse charging is stopped to normally charge the secondary battery BT.

Figure 17:
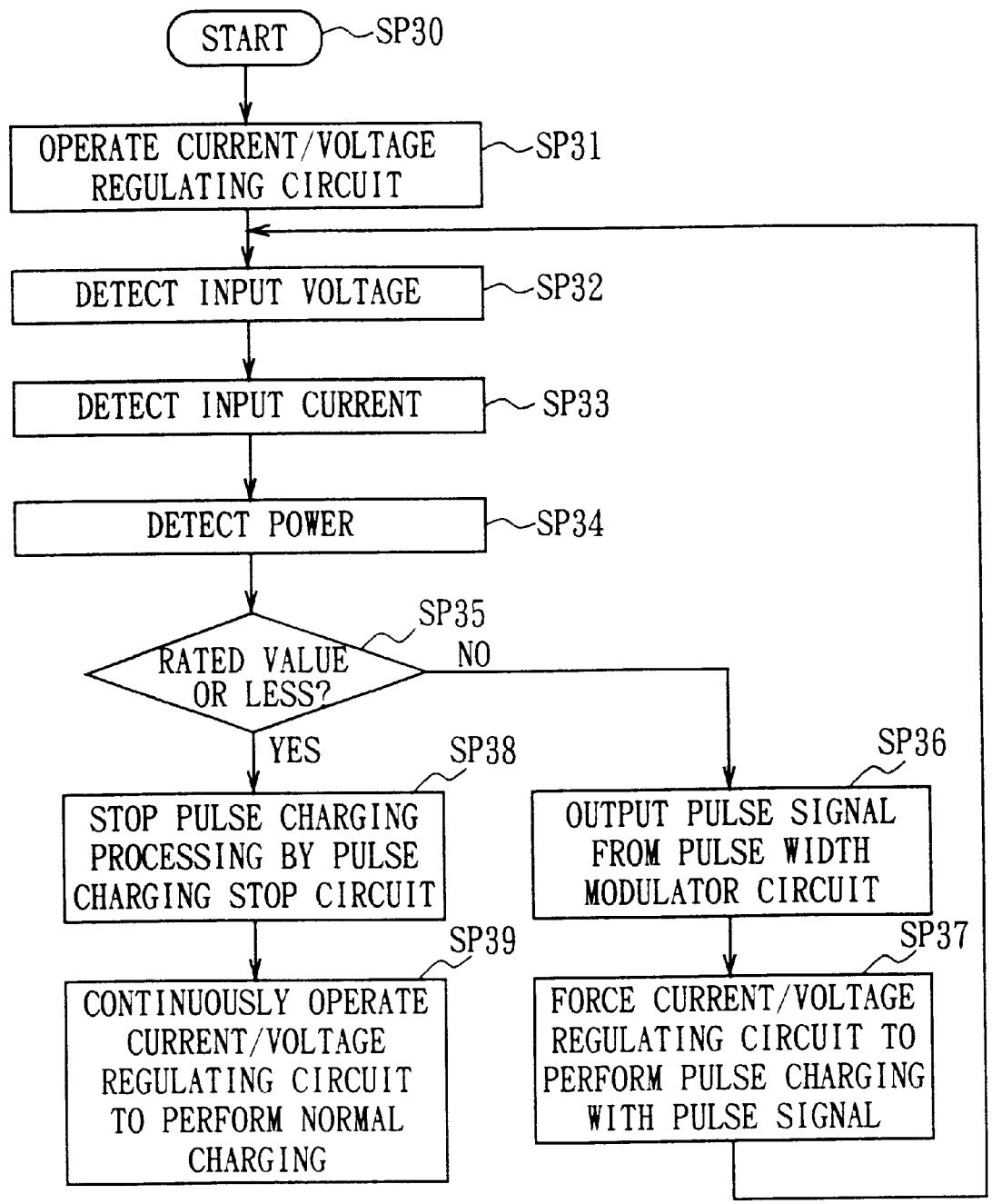
FIG. 17 is a flow chart showing an operational procedure for the battery charger according to the fifth embodiment.

With the foregoing configuration, the battery charger 50 charges the secondary battery BT by executing an operational procedure shown in FIG. 17. Specifically, the operational procedure starts at step SP30, and at step SP31, the current/voltage regulating circuit 22 is continuously operated to normally charge the secondary battery BT. At next step SP32, a voltage value of an input voltage supplied from the direct current power source is detected by the voltage detector circuit 23. At next step SP33, a current value of an input current supplied from the direct current power source is detected by the current detector circuit 21. At next step SP34, the detected voltage value and current value are accumulated by the accumulating circuit 24 to calculate input power supplied from the direct current power source.

At next step SP35, the rated-value-or-less detector circuit 52 detects whether or not the input power is at or below the rated value. As a result, if the input power is above the rated power value, the pulse charging processing consisting of steps SP36 and SP37 is executed. Specifically, a pulse signal having a desired pulse width is outputted from the pulse width modulator circuit 51 at step SP36, and the current/voltage regulating circuit 22 is controlled based on the pulse signal at step SP37 to intermittently operate the current/voltage regulating circuit 22 to charge the secondary battery BT in the pulse charging manner. After the processing is completed, the operational procedure returns to step SP32 to repeat the processing.

On the other hand, if it is detected at step SP35 that the input power is at or below the rated power value, the normal charging processing consisting of steps SP38 and SP39 is executed. Specifically, at step SP38, the rated-value-or-less detector circuit 52 outputs rated-value-or-less information because the input power is at or below the rated power value. The pulse charging stop circuit 53, under receiving the rated-value-or-less information, outputs a control signal for stopping the pulse charging to the control circuit 54. In this way, at step SP 39, the control circuit 54 stops the pulse charging by continuously operating the current/voltage regulating circuit 22 to normally charge the secondary battery BT.

In this way, the battery charger 50 comprises the rated-value-or-less detector circuit 52 for detecting whether or not the input power supplied from the direct current power source is at or below the rated power value, such that the pulse charging is stopped by the pulse charging stop circuit 53 when it is detected by the rated-value-or-less detector circuit 52 that the input power is at or below the rated power value, thereby making it possible to stop the pulse charging without determining by the pulse width modulator circuit 51 whether or not the input power is at or below the rated power value.

According to the foregoing configuration, since the battery charger 50 comprises the rated-value-or-less detector circuit 51 for detecting whether or not input power supplied from the direct current power source is at or below the rated power value and the pulse charging stop circuit 53 for stopping the pulse charging in accordance with the detection result, the pulse charging can be stopped when the input power is at or below the rated power value without determining by the pulse width modulator circuit 51 whether or not the input power is at or below the rated power value.

(7) Sixth Embodiment

Figure 18:
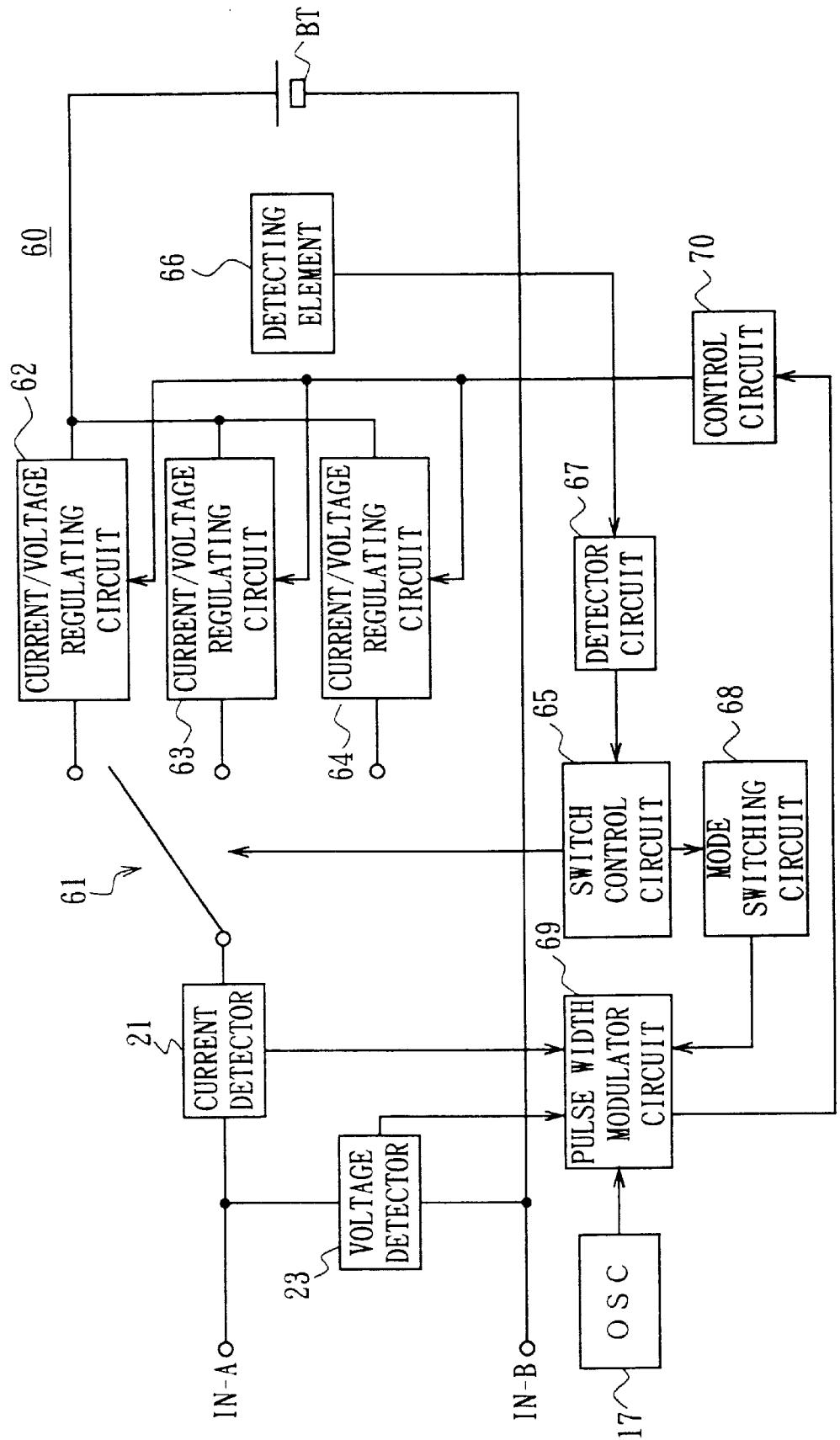
FIG. 18 is a block diagram showing the configuration of a battery charger according to a sixth embodiment.

In FIG. 18 in which the same reference numerals are applied to parts corresponding to FIG. 10, numeral 60 shows a battery charger according to a sixth embodiment as a whole. This embodiment comprises a plurality of current/voltage regulating circuits having different output current values and different output voltage values which are switched in accordance of the type of a secondary battery BT.

First, the battery charger 60 comprises a change-over switch 61 at the output side of a current detector circuit 21. The change-over switch 61 is for switching first, second and third current/voltage regulating circuits 62, 63, 64 having different output current values and different output voltage values, and in accordance with a change-over control signal from a switch control circuit 65 described later, connects an output of the current detector circuit 21 with a predetermined one of the current/voltage regulating circuits 62, 63, 64 to switch a current/voltage regulating circuit to be used for charging.

The first, second and third current/voltage regulating circuits 62, 63, 64 have different output current values and different output voltage values. For example, the first current/voltage regulating circuit 62 is set to an output current $A_1$ and an output voltage $V_1$; the second current/voltage regulating circuit 63 is set to an output current $A_2$ and an output voltage $V_2$; and the third current/voltage regulating circuit 64 is set to an output current $A_3$ and an output voltage $V_3$. The current/voltage regulating circuits having different rated values are thus provided because an optimal charging current and charging voltage depend on the type of battery, and such that any secondary battery BT can be always charged with an optimal charging current and charging voltage.

On the other hand, a detecting element 66 is arranged near the secondary battery BT for detecting the type of battery. The detecting element 66 is connected to a detector circuit 67. The detector circuit 67 detects the type of the secondary battery BT (more specifically, the type of battery such as lithium ion battery, nickel hydrogen battery, nickel-cadmium battery, and so on, the number of cells, and a connection state of the cells such as series connection, parallel connection, and so on) based on a signal from the detecting element 66, and indicates the detected type of the secondary battery BT to the switch control circuit 65.

The switch control circuit 65 determines an optimal current/voltage regulating circuit among the first, second and third current/voltage regulating circuits 62 to 64 in accordance with the type of the secondary battery BT. Then, the switch control circuit 65 outputs a switch control signal to the change-over switch 61 for switching to the optimal current/voltage regulating circuit. In this way, an optimal current/voltage regulating circuit 62, 63 or 64 can be set for the secondary battery BT.

The switch control circuit 65 also outputs to a mode switching circuit 68 setting information indicating which of the current/voltage regulating circuits 62, 63, 64 has been set.

The mode switching circuit 68 outputs a mode switching control signal for switching the mode of a pulse width modulator circuit 69 based on the supplied setting information. The mode is thus switched because an optimal pulse width and an optimal control mode depend on a current/voltage regulating circuit 62, 63 or 64 to be used. Note that, the control mode includes a control mode in favor of current and a control mode in favor of voltage.

The pulse width modulator circuit 69 operates in a control mode in accordance with the mode switching control signal, generates a pulse signal having a desired pulse width according to an input current detected by the current detector circuit 21 or an input voltage detected by the voltage detector circuit 23, and outputs the pulse signal to a control circuit 70. Note that, the pulse width modulator circuit 69 generates the pulse signal if the input current or the input voltage is above a rated value for a set current/voltage regulating circuit 62, 63 or 64, and outputs a signal fixed at logical level "H" in place of the pulse signal if it is at or below the rated value.

The control circuit 70 controls the operation of a set current/voltage regulating circuit 62, 63 or 64 based on a signal supplied from the pulse width modulator circuit 69. Specifically, the control circuit 70 activates the current/voltage regulating circuit 62, 63 or 64 when the signal from the pulse width modulator circuit 69 is at logical level "H", and deactivates the current/voltage regulating circuit 62, 63 or 64 when at logical level "L". Therefore, the current/voltage regulating circuit 62, 63 or 64 is intermittently operated to charge the secondary battery BT in the pulse charging manner when an input current or an input voltage is above the rated value, while the current/voltage regulating circuit 62, 63 or 64 is continuously operated to normally charge the secondary battery BT when an input current or an input voltage is at or below the rated value.

Figure 19:
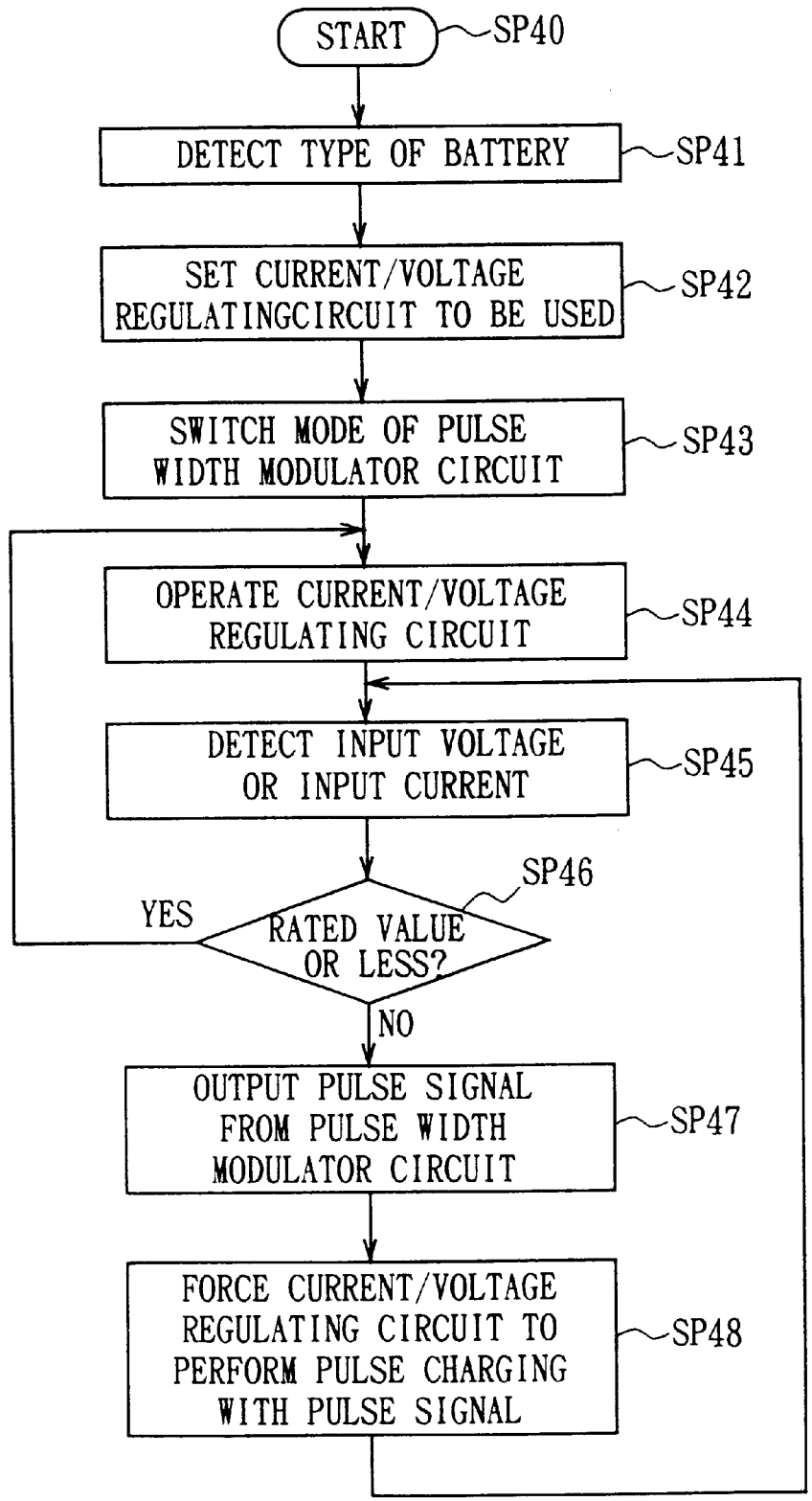
FIG. 19 is a flow chart showing an operational procedure for the battery charger according to the sixth embodiment.

With the foregoing configuration, the battery charger 60 charges the secondary battery BT by executing an operational procedure shown in FIG. 19. Specifically, the operational procedure starts at step SP40, and at step SP41, the type of the secondary battery BT is detected by the detecting element 66 and the detector circuit 67. At next step SP42, an optimal circuit is determined among the first, second and third current/voltage regulating circuits 62, 63, 64 based on the detected type of the battery, and outputs a switching control signal to the change-over switch 61 to set the current/voltage regulating circuit 62, 63 or 64.

At next step SP43, the mode of the pulse width modulator circuit 69 is switched to a mode corresponding to the set current/voltage regulating circuit 62, 63 or 64. At next step SP44, the set current/voltage regulating circuit 62, 63 or 64 is continuously operated. Specifically, not the pulse charging, the normal charging is performed to constantly supply a charging current and a charging voltage.

At next step SP45, an input current or an input voltage is detected by the current detector circuit 21 or the voltage detector circuit 23. At next step SP46, it is determined whether or not the detected input current or input voltage is at or below the rated value. As a result, if the detected input current or input voltage is at or below the rated value, the operational procedure returns to step SP44 to operate the current/voltage regulating circuit 62, 63 or 64 as it is. Conversely, if it is above the rated value, a pulse signal is outputted from the pulse width modulator circuit 69 at step SP47, and at step SP48, the current/voltage regulating circuit 62, 63 or 64 is controlled based on the pulse signal to intermittently operate the current/voltage regulating circuit 62, 63 or 64 to charge the secondary battery BT in the pulse charging manner. After the processing is completed, the operational procedure returns to step SP45 to repeat the processing.

In this way, the battery charger 60 comprises the first, second and third current/voltage regulating circuits 62, 63, 64 having different output current values and different output voltage values, and switches to a current/voltage regulating circuit to be used in accordance with the type of the secondary battery BT detected by the detecting element 66 and the detector circuit 67. In this way, the secondary battery BT can be charged with an optimal charging current and charging voltage.

Also, in the battery charger 60, when a detected input current or input voltage is above the rated value, a pulse signal is outputted from the pulse width modulator circuit 69 to intermittently operate the set current/voltage regulating circuit 62, 63 or 64 based on the pulse signal. In this way, the current/voltage regulating circuit 62, 63 or 64 can be protected from damages.

According to the foregoing configuration, the current/voltage regulating circuits 62, 63, 64 having different output current values and different output voltage values are provided such that the current/voltage regulating circuits 62, 63, 64 are switched in accordance with the type of the secondary battery BT, so that the secondary battery BT can be charged with an optimal charging current and charging voltage.

Also, if a detected input current or input voltage is above the rated value, the set current/voltage regulating circuit 62, 63 or 64 is intermittently operated, thereby making it possible to easily protect the current/voltage regulating circuit 62, 63 or 64 from damages.

(8) Seventh Embodiment

Figure 20A:
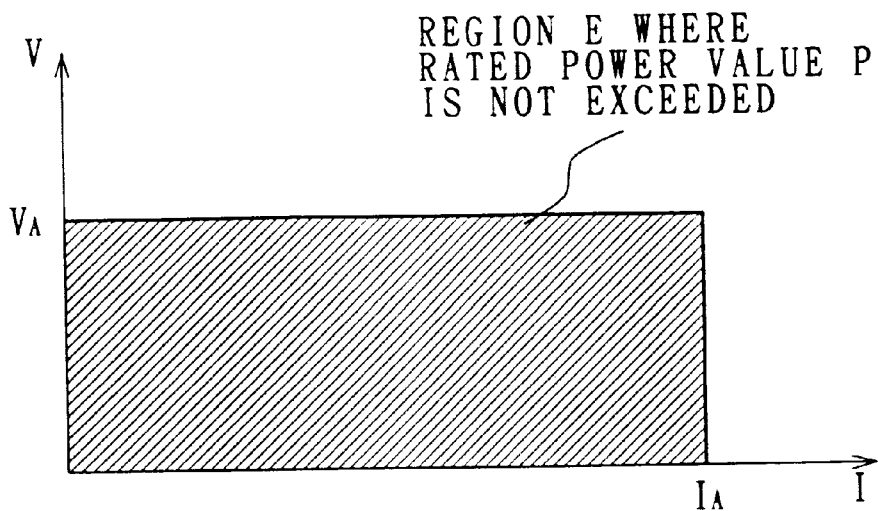
FIGS. 20A and 20B are schematic diagrams explaining the principles of a battery charger according to a seventh embodiment.

At first, the principles of a battery charger of this embodiment will be explained. For switching the operation of a current/voltage regulating circuit to the pulse charging based on input power, it must be determined whether or not the input power exceeds a rated power value P. As a detecting method therefor, assuming that a voltage and a current which generate power P are $V_A$ and $I_A$ respectively, an input voltage and an input current are detected. It is determined that the rated power value P is not exceeded if the detection results are both below the voltage reference value $V_A$ and the current reference value $I_A$, and otherwise it is determined that the rated power value P is exceeded. In other words, as shown in FIG. 20A, it is determined that the rated power value P is not exceeded when an input voltage and an input current are both within a region E.

However, since the position for the power P is actually a point on a broken line F shown in FIG. 20B, it can be said that any position below the broken line F will not cause the power to exceed the rated power value P.

Thus, in this embodiment, a lager number of reference values for detecting an input voltage and an input current are provided so that input power is more finely detected, in order to more accurately control the pulse charging. For example, assuming that voltage reference values are voltages $V_A$, $V_B$, $V_C$ as shown in FIG. 20B and current reference values are currents $I_A$, $I_B$, $I_C$ as shown in FIG. 20B, it is determined whether or not an input voltage and an input current exceed the respective reference values, in order to determine whether or not input power is within a region G in which the input power does not exceed the rated power value P. If the region G is not exceeded, a voltage and a current are constantly supplied to perform the normal charging. Conversely, if the region G is exceeded, optimal pulse charging is performed in accordance with the power. For example, if a detected input voltage and input current are located at a point H in FIG. 20B (i.e., $V_B$<input voltage<$V_C$ and $I_C$<input current<$I_B$), a current/voltage regulating circuit may be driven, for example, in a control mode for reducing the current to $I_C$ or lower, thereby suppressing the power to the rated value or lower to protect the circuit from damages.

Figure 21:
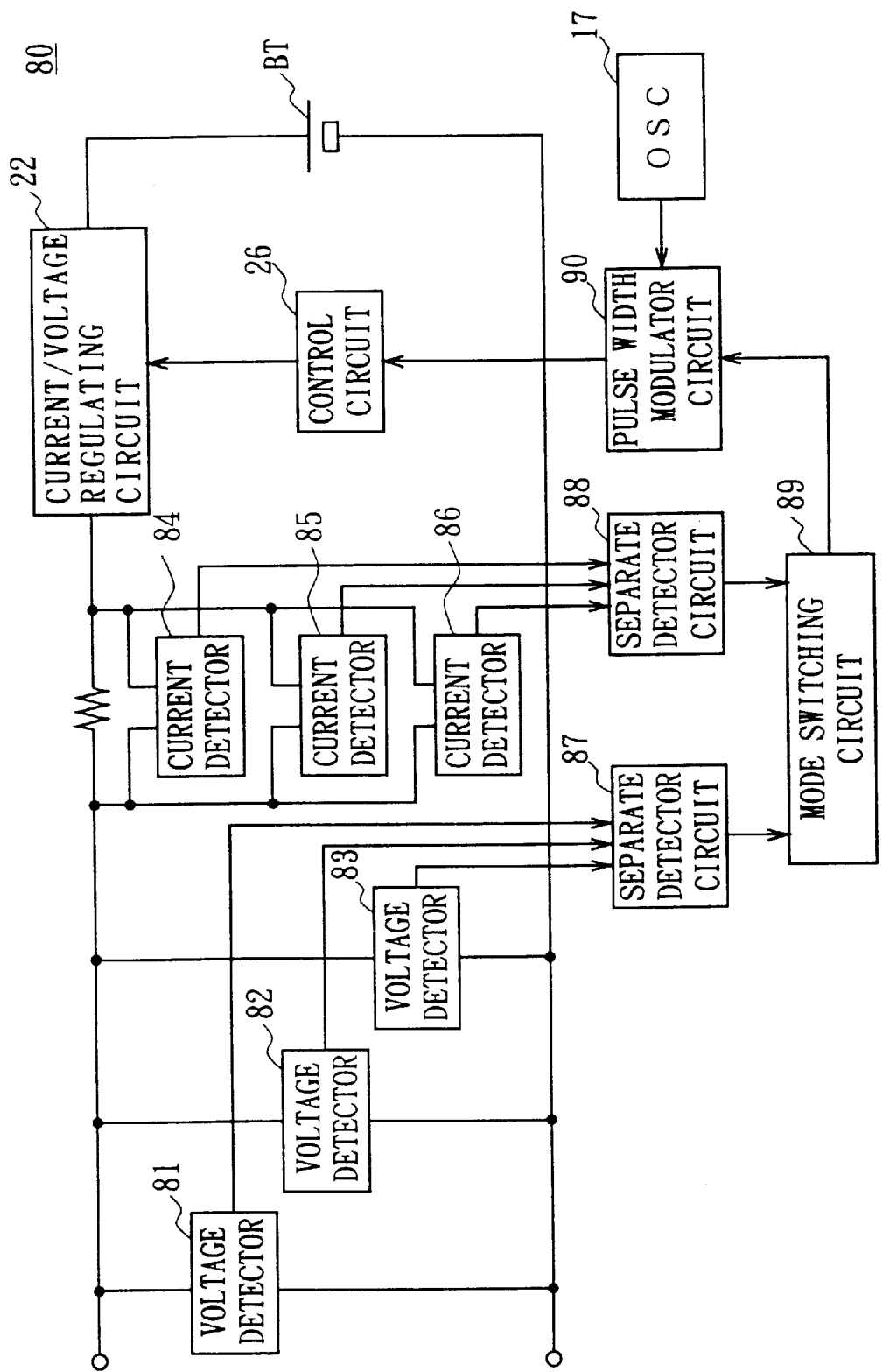
FIG. 21 is a block diagram showing the configuration of the battery charger according to the seventh embodiment.

Now, a battery charger according to the seventh embodiment will be described with reference to FIG. 21. In FIG. 21 in which the same reference numerals are applied to parts corresponding to FIG. 10, numeral 80 shows a battery charger according to the seventh embodiment as a whole, and comprises a plurality of voltage detector circuits 81 to 83 having different detection voltage values and a plurality of current detector circuits 84 to 85 having different detection current values.

The first voltage detector circuit 81 detects whether or not an input voltage exceeds the voltage $V_A$ (see FIG. 20B), and supplies a first separate detector circuit 87 with the detection result. Further, the second voltage detector circuit 82 detects whether or not the input voltage exceeds the voltage $V_B$ (see FIG. 20B), and supplies the first separate detector circuit 87 with the detection result in the same manner. Furthermore, the third voltage detector circuit 83 detects whether or not the input voltage exceeds the voltage $V_C$ (see FIG. 20B), and supplies the first separate detector circuit 87 with the detection result in the same manner.

On the other hand, the first current detector circuit 84 detects whether or not an input current exceeds the current $I_A$ (see FIG. 20B), and supplies a second separate detector circuit 88 with the detection result. Further, the second current detector circuit 85 detects whether or not the input current exceeds the current $I_B$ (see FIG. 20B), and supplies the second separate detector circuit 88 with the detection result in the same manner. Furthermore, the third current detector circuit 86 detects whether or not the input current exceeds the current $I_C$ (see FIG. 20B), and supplies the second separate detector circuit 88 with the detection result in the same manner.

Figure 20B:
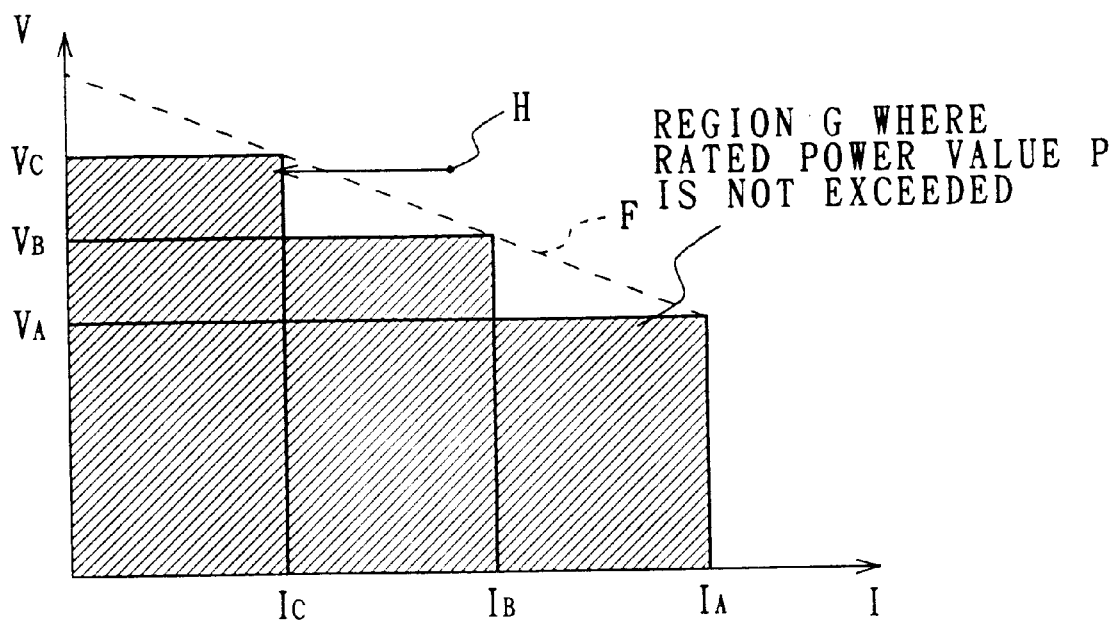

The first separate detector circuit 87 detects which of the ranges in FIG. 20B the input voltage is located within, based on the detection results respectively supplied from the three voltage detector circuits 81 to 83, and supplies a mode switching circuit 89 with the detection result.

Further, the second separate detector circuit 88 detects which of the ranges in FIG. 20B the input current is located within, based on the detection results respectively supplied from the three current detector circuits 84 to 86, and supplies the mode switching circuit 89 with the detection result.

The mode switching circuit 89 detects which of the regions the input voltage and the input current exist within, based on the detection result related to the voltage range and the detection result related to the current range respectively supplied from the first and second separate detector circuits 87 and 88. As a result, the mode switching circuit 89 notifies a pulse width modulator circuit 90 of a normal charging control mode if they exist within the region G shown in FIG. 20B, and notifies the pulse width modulator circuit 90 of an optimal pulse charging control mode corresponding to the region if they exist out of the region G.

The pulse width modulator circuit 90 generates a pulse signal having an optimal pulse width corresponding to the control mode notified from the mode switching circuit 89 based on a clock signal from the oscillator 17, and outputs the pulse signal to a control circuit 26. Note that, the pulse width modulator circuit 90 outputs a signal fixed at logical level "H" to the control circuit 26 when notified of the normal charging control mode.

The control circuit 26 controls the operation of the current/voltage regulating circuit 22 in accordance with a logical level of the signal supplied from the pulse width modulator circuit 90. Specifically, the control circuit 26 activates the current/voltage regulating circuit 22 when the signal is at logical level "H", and deactivates the current/voltage regulating circuit 22 when at logical level "L". In this way, the current/voltage regulating circuit 22 can be intermittently operated to perform the pulse charging when the pulse signal is supplied from the pulse width modulator circuit 90, while the current/voltage regulating circuit 22 can be continuously operated to perform the normal charging when the signal fixed at logical level "H" is supplied from the pulse width modulator circuit 90.

Figure 22:
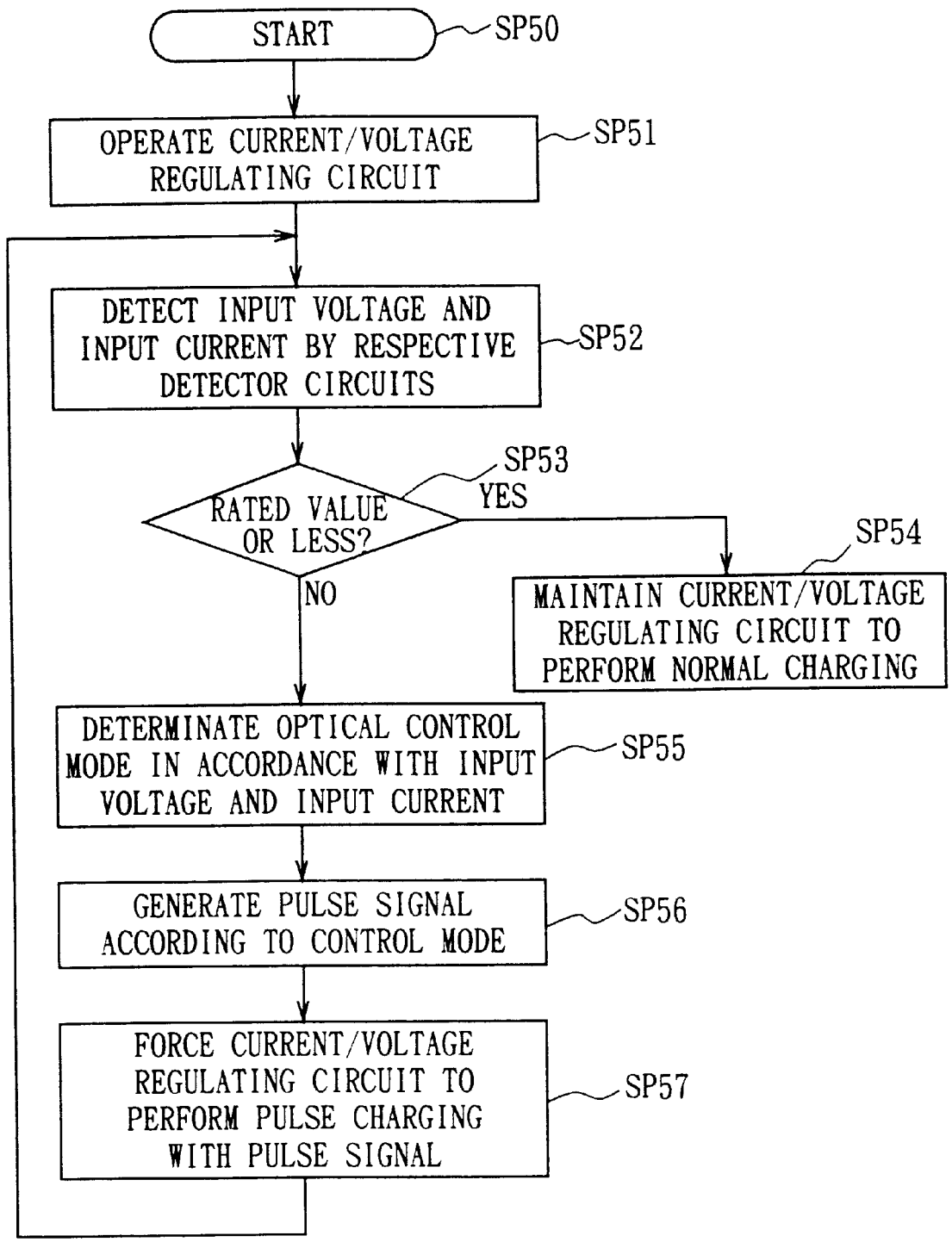
FIG. 22 is a flow chart showing an operational procedure for the battery charger according to the seventh embodiment.

With the foregoing configuration, the battery charger 80 charges the secondary battery BT by executing an operational procedure shown in FIG. 22. Specifically, the operational procedure starts at step SP50, and at step SP51, the current/voltage regulating circuit 22 is continuously operated to normally charge the secondary battery BT. At next step SP52, an input voltage and an input current are detected by the voltage detector circuits 81 to 83 and the current detector circuits 84 to 86.

At next step SP53, it is determined from the detection result of the detected voltage and the detection result of the detected current whether or not the input voltage and the input current are at or below their respective rated values. In other words, it is detected whether or not the input voltage and the input current exist within the region G shown in FIG. 20B. As a result, if they are determined to be at or below the rated values because they exist within the region G, at step SP54, the current/voltage regulating circuit 22 is operated as it is to normally charge the secondary battery BT.

Conversely, if they are determined to be above the rated values because they exist out of the region G, at step SP55, an optimal control mode is determined in accordance with the input voltage and the input current. At next step SP56, the control mode is notified to the pulse width modulator circuit 90 to generate a pulse signal having an optimal pulse width according to the control mode. At next step SP57, the current/voltage regulating circuit 22 is operated based on the pulse signal to charge the secondary battery BT in the pulse charging manner in an optimal state. In this way, the power can be reduced to the rated value or lower to protect the current/voltage regulating circuit 22 from damages. After this processing is completed, the operational procedure returns to step SP52 to repeat the processing.

According to the foregoing configuration, since the battery charger 80 comprises the plurality of voltage detector circuits 81 to 83 having different detection voltage values and the plurality of current detector circuits 84 to 86 having different detection current values, an input voltage and an input current can be more accurately detected to correctly control the pulse charging, thereby ensuring that the current/voltage regulating circuit 22 can be protected from damages.

(9) Eighth Embodiment

Figure 23:
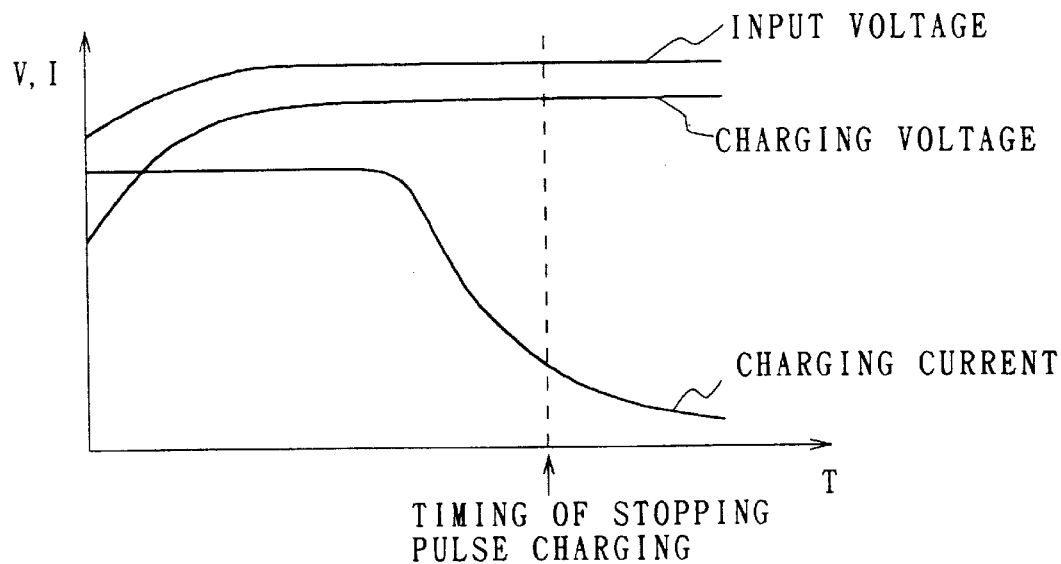
FIG. 23 is a schematic diagram explaining the principles of detecting a fully charged battery.

The eighth embodiment will be described in connection with a method of detecting whether or not a charging operation for a secondary battery BT has been completed (in other words, whether or not the secondary battery BT has been fully charged). As the secondary battery BT becomes more charged, the relationship between a charging voltage and a charging current varies as shown in FIG. 23. Specifically, the charging voltage converges to a constant voltage as the secondary battery BT is charged closer to a full charge point, while the charging current is decreasing as the secondary battery BT is charged closer to the full charge point. In this event, as is apparent from FIG. 23, the change in the charging current is more remarkable. It is therefore possible to detect whether or not the secondary battery BT is fully charged by detecting the charging current.

However, since the charging current is intermittently changed under the pulse charging, it is desirable to detect the charging current after the pulse charging is completed, in order to reliably detect the charging current. In the present invention, therefore, the charging current is detected to check for the full charge after the pulse charging is stopped.

Figure 24:
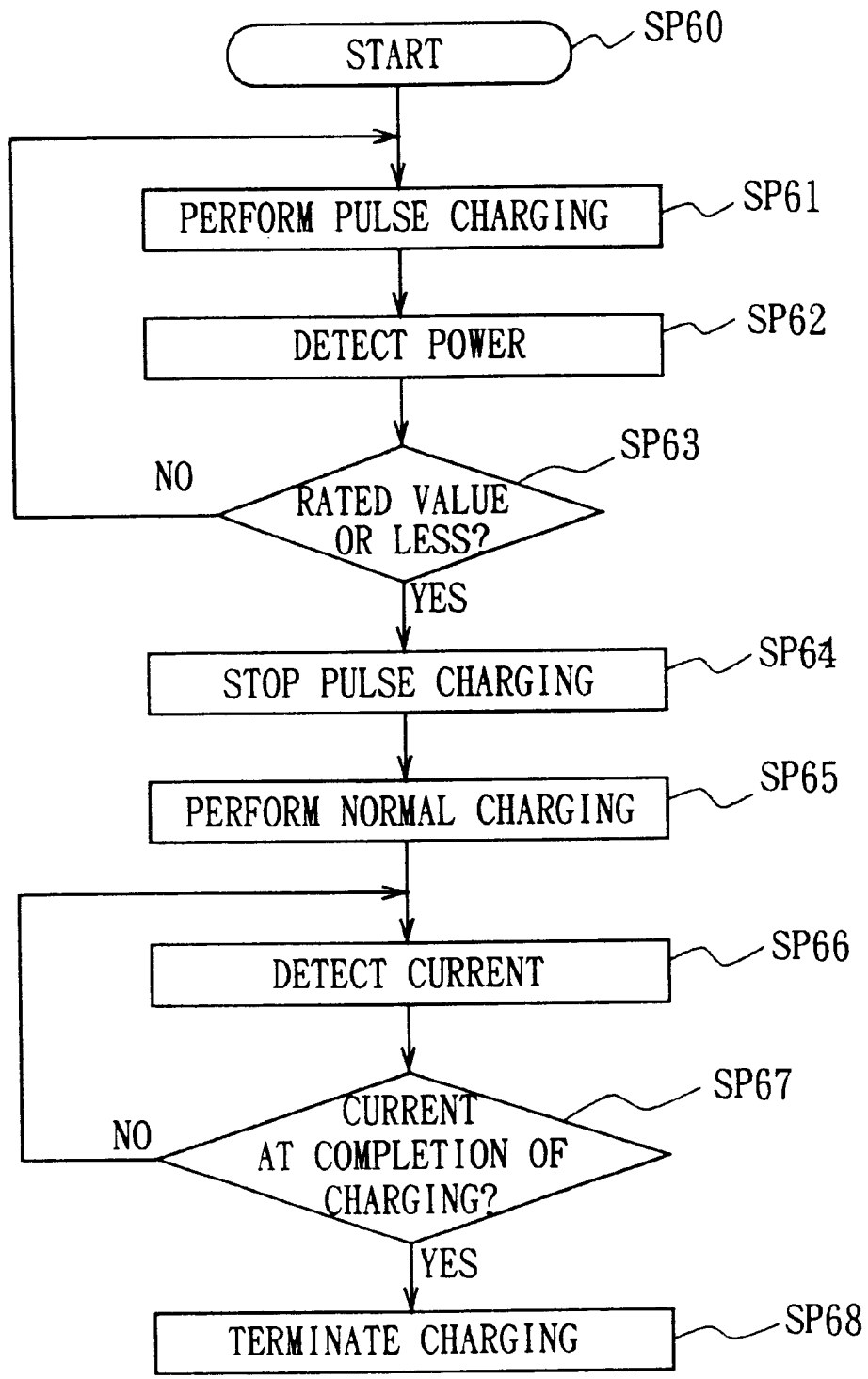
FIG. 24 is a flow chart showing a procedure for detecting a fully charged battery.

Now, a procedure for detecting the full charge will be described with reference to a flow chart shown in FIG. 24. In this connection, a battery charger used herein has a configuration according to any of the foregoing first to seventh embodiments. Also, FIG. 24 shows a procedure after entering a pulse charging state.

First, the procedure starts at step SP60, and at step SP61, a pulse charging operation is performed, and then the power is detected at next step SP62. At next step SP63, it is determined whether or not the detected power is at or below a rated power value. The procedure returns to step SP61 if the detected power is above the rated power value to continuously perform the pulse charging, while the procedure proceeds to step SP64 if the detected power is at or below the rated power value. At step SP64, the pulse charging is stopped by ceasing to output the pulse signal, and at next step SP65, a current/voltage regulating circuit is continuously operated to perform a normal charging operation.

At next step SP66, an input current is detected by a current detector circuit, and at next step SP66, it is determined whether or not the input current is equal to the current at the completion of charging. As a result, the procedure returns to step SP66 to repeat the processing if the input currecnt is above the current at the completion of charging, while the procedure proceeds to step SP68 if the input current is below the current at the completion of charging to terminate the charging by stopping the operation of the current/voltage regulating circuit.

Thus, according to the foregoing configuration, the full charge is detected by checking the charging current after the pulse charging is stopped, so that the full charge can be correctly detected by detecting an accurate current.

(9) Other Embodiments

Figure 25:
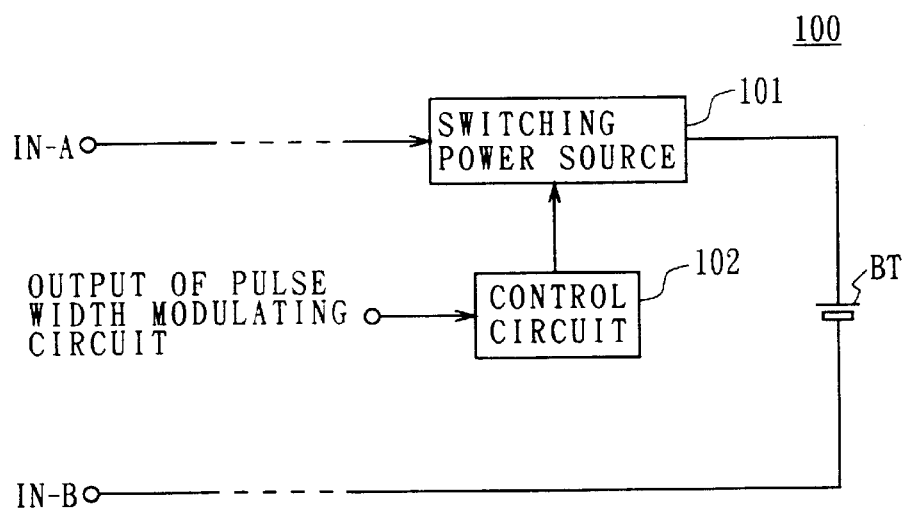
FIG. 25 is a block diagram showing the configuration of a battery charger which controls the operation of a switching power source by a pulse signal.

Note that, in the aforementioned embodiments, the present invention is applied to a battery charger using a current regulating circuit and a voltage regulating circuit as shown in FIG. 5, 6 or 11. However, the present invention is not limited thereto and the present invention can be applied to the battery charger 100 using the switching power source 101 as shown in FIG. 25. In this connection, also in this case, a pulse signal outputted from a pulse width modulator circuit is supplied to the control circuit 102 for controlling the operation of the switching power source 101 such that the control circuit 102 intermittently operates the switching power source 101 based on the pulse signal to perform the pulse charging.

Figure 26:
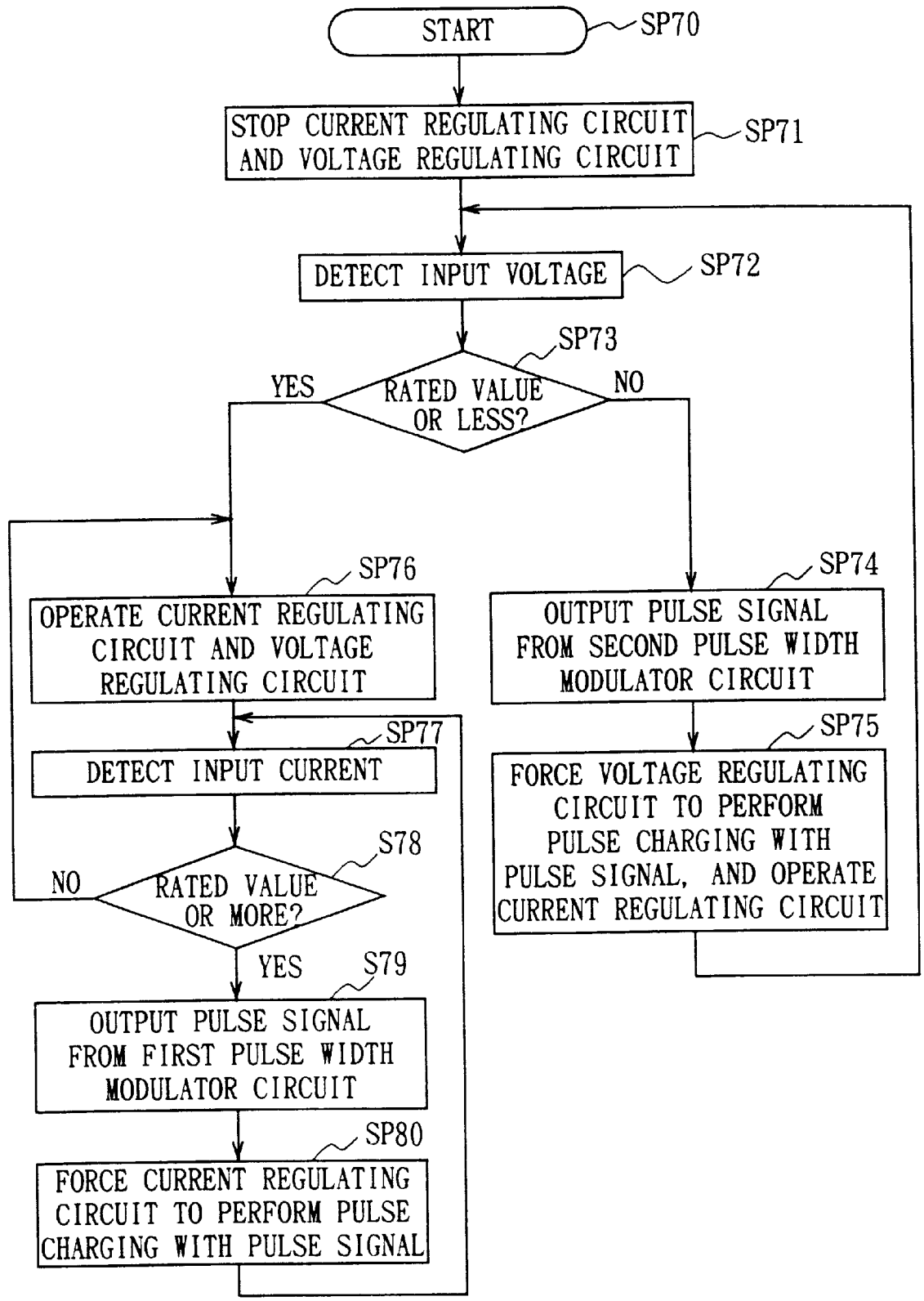
FIG. 26 is a flow chart showing another operational procedure for the battery charger of the first embodiment.

Further, in the aforementioned first embodiment, a charging operation is performed in accordance with the procedure as shown in FIG. 9, the present invention is not limited thereto and the charging operation can be performed in accordance with the procedure as shown in FIG. 26. Specifically, the procedure starts at step SP70, and at step SP71, the current regulating circuit 11 and the voltage regulating circuit 12 are stopped, and at next step SP72, an input voltage is detected by the voltage detector circuit 13. At next step SP73, it is determined whether or not the detected voltage is at or below the rated voltage value. As a result, if the detected voltage is above the rated voltage value, at step SP74, a pulse signal having a desired pulse width is generated from the second pulse modulator circuit 16. Then, at next step SP75, the voltage regulating circuit 12 is operated based on the pulse signal to have the voltage regulating circuit 12 perform a pulse charging operation. After this processing is completed, the procedure returns to step SP72 to repeat the processing.

On the other hand, if it is determined at step SP73 that the detected voltage is at or below the rated voltage value, at step SP76, the current regulating circuit 11 and the voltage regulating circuit 12 are activated. At next step SP77, an input current is detected by the current detector circuit 14. At next step SP78, it is determined whether or not the detected input current is at or below the rated current value. As a result, if the detected input current is at or below the rated current value, the procedure returns to step SP76 to repeat the processing. Conversely, if the input current is above the rated current value, at step SP79, a pulse signal having a desired pulse width is generated from the first pulse width modulator circuit 15. At next step SP80, the current regulating circuit 11 is activated based on the pulse signal to have the current regulating circuit 11 perform a pulse charging operation. After this processing is completed, the procedure returns to step SP77 to repeat the processing.

In this way, under stopping the operations of the current regulating circuit 11 and the voltage regulating circuit 12, an input voltage can be detected without charging the secondary battery BT, and then it can be determined whether or not the voltage regulating circuit 12 should be operated to perform the pulse charging.

Figure 27:
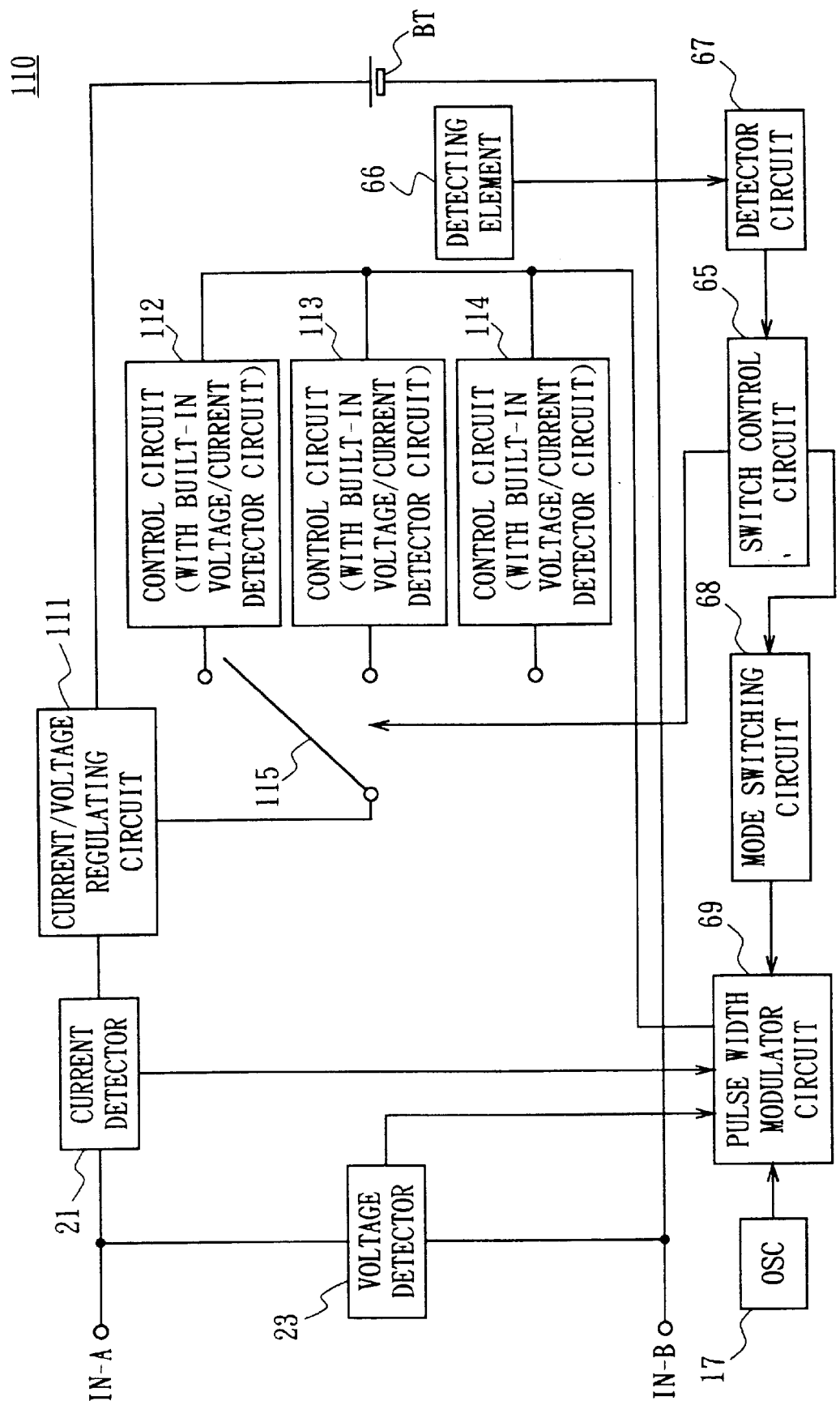
FIG. 27 is a block diagram showing the configuration of a battery charger which switches control circuits in accordance with the type of battery.

Further, in the aforementioned sixth embodiment, the battery charger comprises the current/voltage regulating circuits 62, 63, 64 having different output current values and different output voltage values such that the current/voltage regulating circuits 62, 63, 64 are switched in accordance with the type of the second battery BT detected by the detecting element 66 and the detector circuit 67. However, the present invention is not limited thereto and as shown in FIG. 27, in which the same reference numerals are applied to parts corresponding to FIG. 18, the control circuits 112, 113, 114 can be switched in accordance with the type of a detected secondary battery BT. Specifically explaining, a current/voltage regulating circuit 111 is not provided with a current detecting element and a voltage detecting element for controlling a regulated current and a regulated voltage, but a current detecting element and a voltage detecting element are arranged in the control circuits 112, 113, 114. In this event, the control circuits are arranged so as to detect different current values and different voltage values. In the case where the control circuits 112, 113, 114 described above are switched using a switching control circuit 65 and a change-over switch 115, a current and a voltage outputted from the current/voltage regulating circuit 111 can be different. Thus, if it is so arranged that the control circuits 112, 113, 114 described above are switched in accordance with the type of the detected secondary battery BT, the secondary battery BT can be charged with an optimal charging voltage and charging current.

Figure 28:
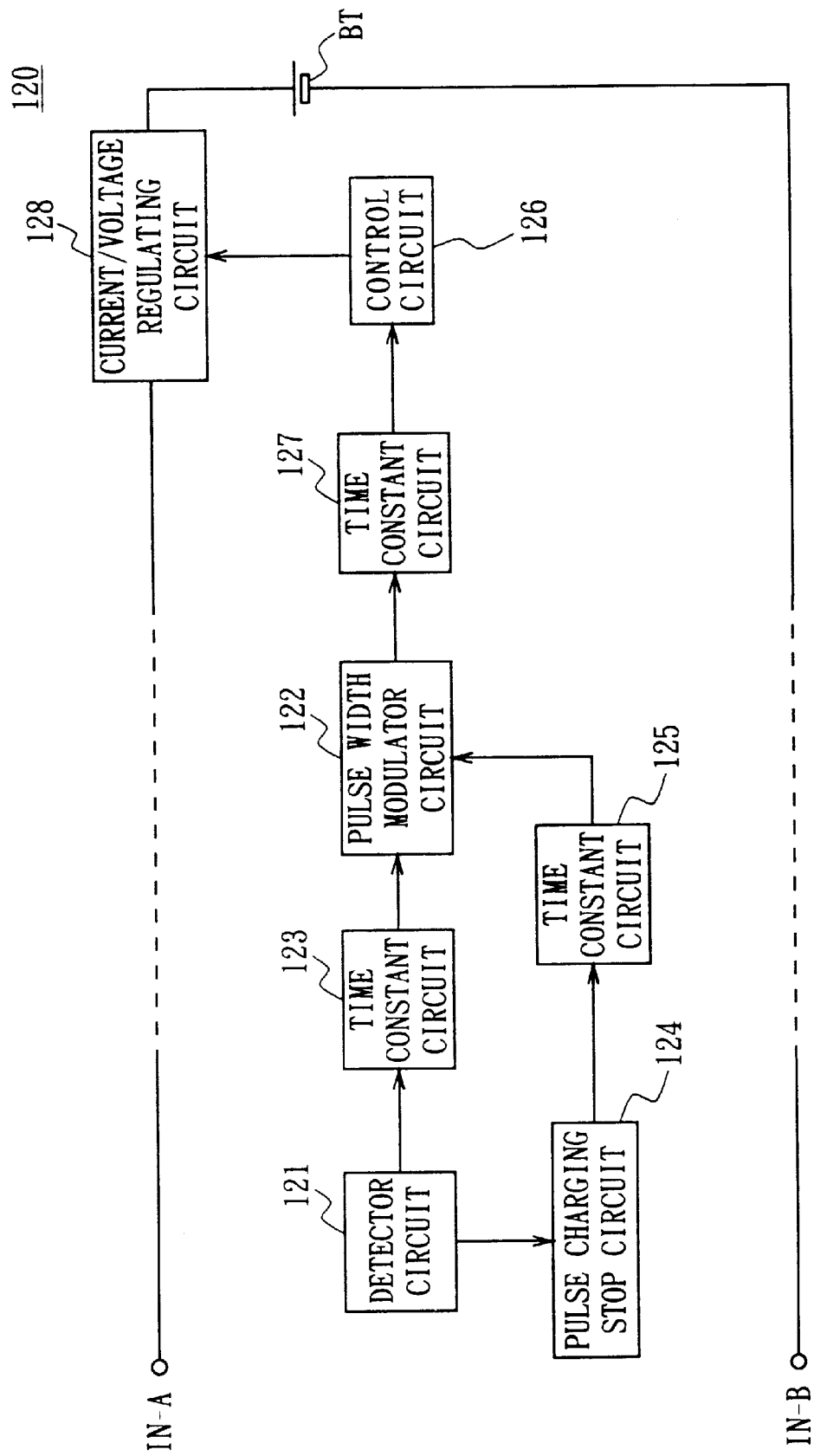
FIG. 28 is a block diagram showing the configuration of a battery charger comprising time constant circuits.

Further, in the aforementioned embodiments, no time constant circuit is inserted between circuits for adjusting the timing. However, the present invention is not limited thereto and a time constant circuit for adjusting the timing can be inserted between respective circuits or between desired circuits. For example, as shown in FIG. 28, a time constant circuit 123 can be inserted between a detector circuit 121 for detecting a voltage, a current or power and a pulse width modulator circuit 122 for generating a pulse signal, to adjust the timing of passing a detection result. Also, a time constant circuit 125 can be inserted between a pulse charging stop circuit 124 for stopping the pulse charging and the pulse width modulator circuit 122, to adjust the timing of passing a control signal for stopping the pulse charging. Further, a time constant circuit 127 can be inserted between the pulse width modulator circuit 122 and a control circuit 126, to adjust the timing of passing a pulse signal. Note that, a time constant circuit is not limited to a particular position into which it is inserted, but can be arranged at a desired position.

Figure 29:
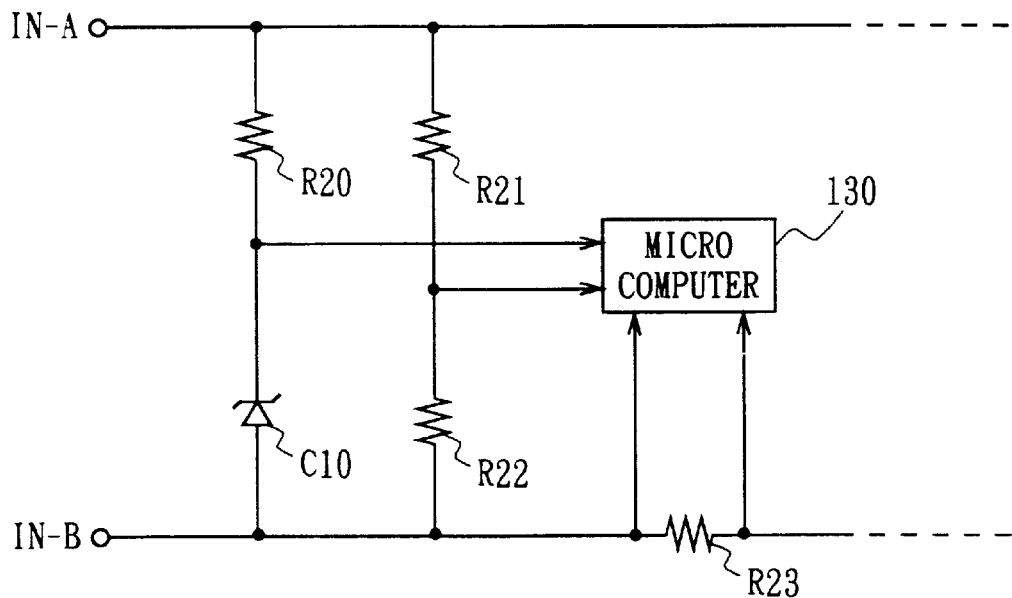
FIG. 29 is a connection diagram showing a voltage and current detector circuit using a microcomputer.

Further, in the aforementioned embodiments, as a voltage detector circuit and a current detector circuit, the circuits as shown in FIGS. 7 and 8 are used. However, the present invention is not limited thereto and as shown in FIG. 29, a microcomputer 130 can be used to detect a voltage and a current. Specifically, a reference potential generated by a resistor R20 and a zener diode D10 and a voltage generated by dividing an input voltage obtained by a resistor R21 and a resistor R22 can be fetched into the microcomputer 130 to detect an input voltage based on these voltages by the microcomputer 130. Further, potentials at both ends of a resistor R23 can be fetched into the microcomputer 130 to detect an input current based on the potentials at both ends of the resistor R23 by the microcomputer 130.

Figure 30:
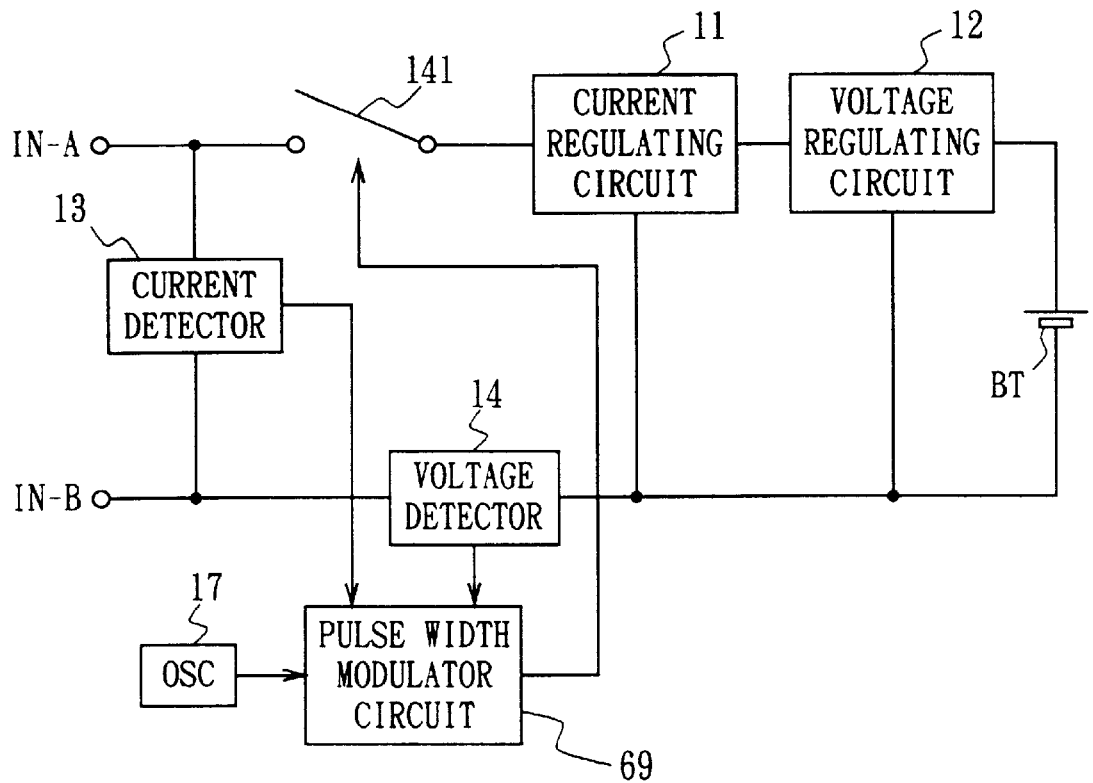
FIG. 30 is a block diagram showing the configuration of a battery charger which performs the pulse charging by switching a switch ON and OFF.

Further, in the aforementioned embodiments, the pulse charging is performed by controlling the operation of the current regulating circuit, the voltage regulating circuit or the current/voltage regulating circuit based on a pulse signal generated by the pulse width modulator circuit. However, the present invention is not limited thereto and a switching element can be arranged at the former stage of the current regulating circuit, the voltage regulating circuit, or the current/voltage regulating circuit such that the switching element can be switched ON and OFF based on a pulse signal to perform the pulse charging. For example, as shown in FIG. 30, a switching element 141 for the pulse charging can be arranged at the former stage of a current regulating circuit 11 and a voltage regulating circuit 12 such that the switching element 141 is switched ON and OFF based on a pulse signal outputted from a pulse width modulator circuit 69 to perform the pulse charging, with the result that similar effects can be obtained as is the case of the aforementioned embodiments.

Figure 31:
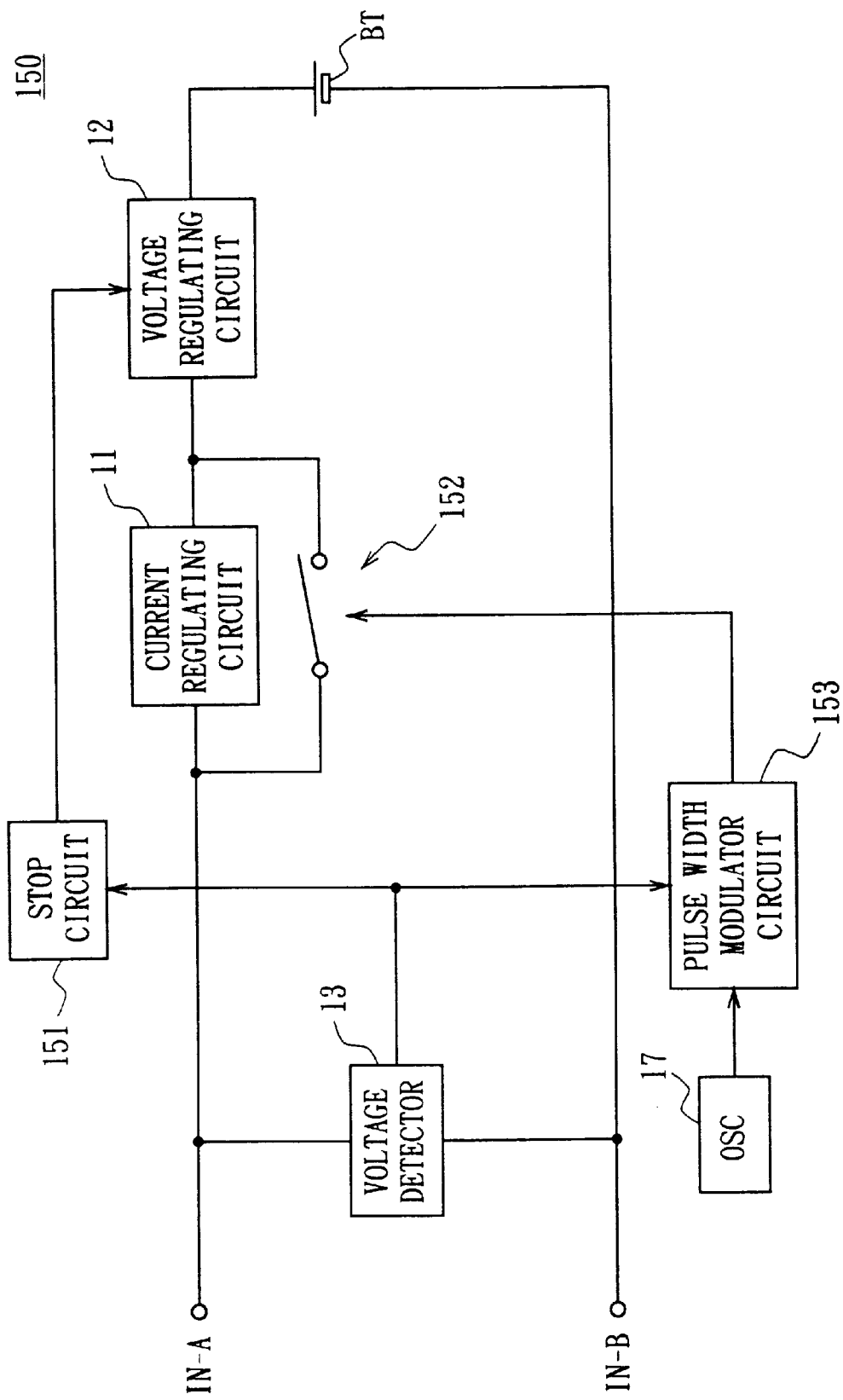
FIG. 31 is a block diagram showing the configuration of a battery charger in which a current regulating circuit is bypassed by the switch.

In addition, the present invention is not limited thereto and as shown in FIG. 31, a switching element 152 connected in parallel with the current regulating circuit 11 for bypassing the current regulating circuit 11 can be arranged such that the switching element 152 is switched ON and OFF in accordance with a pulse signal from a pulse width modulator circuit 153 to perform the pulse charging. Since the configuration eliminates an impedance of the current regulating circuit 11 when it is bypassed, the current regulating circuit 11 can be prevented from damages by generating a circuit loss larger than an allowable loss. Note that, in this case, the voltage regulating circuit 12 can also be protected from damages by stopping its operation by a stop circuit 151 when the voltage detector circuit 13 detects that an input voltage is above the rated value.

Figure 32:
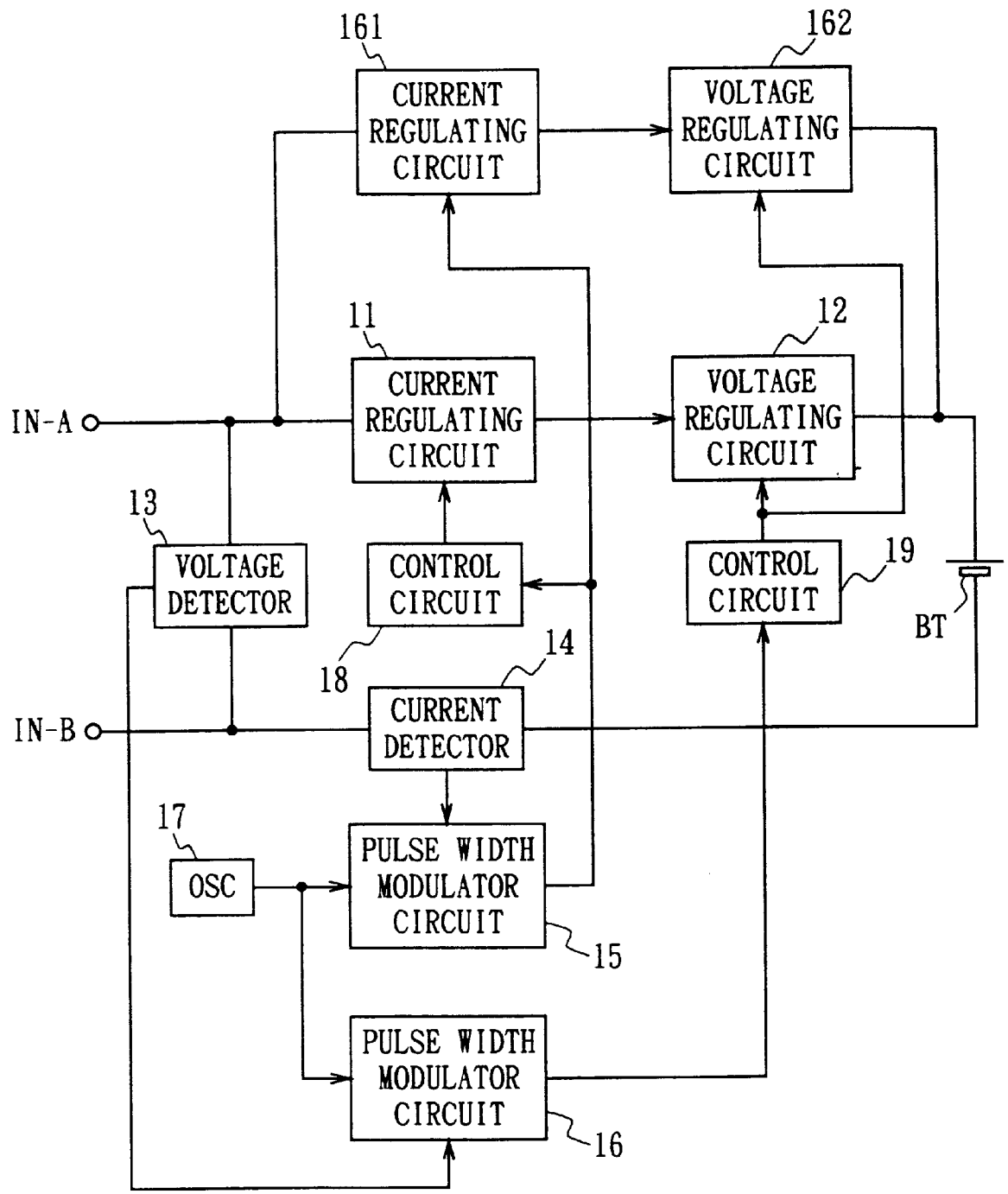
FIG. 32 is a block diagram showing a battery charger which comprises two lines of current regulating circuits and voltage regulating circuits having different ratings which are connected in parallel.

Further, in the aforementioned sixth embodiment, the present invention is applied to the battery charger 60 which comprises a plurality of current/voltage regulating circuits having different output currents and different output voltages which are switched using the change-over switch 61. However, the present invention is not limited thereto and as shown in FIG. 32, the present invention can be applied to a battery charger 160 which includes a parallel connection of a first line having a first current regulating circuit 11 for outputting a first output current and a first voltage regulating circuit 12 for outputting a first output voltage, connected in series, and a second line having a second current regulating circuit 161 for outputting a second output current and a second voltage regulating circuit 162 for outputting a second output voltage, connected in series. In this connection, while the operations of the first and second current regulating circuits 11, 161 are controlled by a control circuit 18 and the operations of the first and second voltage regulating circuit 12, 162 are controlled by a control circuit 19, they can be separately controlled.

Further, in the aforementioned sixth embodiment, no particular reference has been made to the detecting element 66. However, a resistor, a thermistor or the like can be used as the detecting element, wherein a current or a voltage supplied from the resistor or the thermistor can be detected to detect the type of a battery.

Further, in the aforementioned sixth embodiment, three current/voltage regulating circuits having different output currents and different output voltages are arranged. However, the present invention is not limited thereto and any number of current/voltage regulating circuits can be provided. In addition, the present invention is not limited thereto and some of the plural current/voltage regulating circuits having different output currents and different output voltages can be formed of switching power sources. Further, the present invention is not limited thereto and, instead of the current/voltage regulating circuit which comprises a combination of a current regulating circuit portion and a voltage regulating circuit portion, a current regulating circuit and a voltage regulating circuit can be separately provided as shown in FIGS. 5 and 6.

Further, in the aforementioned third embodiment, a potential difference between the input and the output of the current regulating circuit 11 is detected to calculate the power of the current regulating circuit 11, while a potential difference between the input and the output of the voltage regulating circuit 12 is detected to calculate the power of the voltage regulating circuit 12, and then the pulse charging is controlled based on the calculation results. However, the present invention is not limited thereto and in the case where a current regulating circuit and a voltage regulating circuit are combined into a single current/voltage regulating circuit, a potential difference between an input and an output of the current/voltage regulating circuit can be detected to calculate the power of the current/voltage regulating circuit, and then the pulse charging can be controlled based on the calculation result.

Further, in the aforementioned second embodiment, an input current detected by the current detector circuit 21 and an input voltage detected by the voltage detector circuit 23 are accumulated by the accumulating circuit 24 to calculate input power, and then the operation of the current/voltage regulating circuit 22 is controlled based on the input power. However, the present invention is not limited thereto and in the case where a current regulating circuit and a voltage regulating circuit are separately arranged, the current regulating circuit and the voltage regulating circuit can be separately controlled with input power calculated by an accumulating circuit.

Further, in the aforementioned fourth embodiment, the pulse charging is performed by controlling the current/voltage regulating circuit 22 with a priority pulse signal. However, the present invention is not limited thereto and a switching element can be arranged at the former stage of the current/voltage regulating circuit 22 such that the switching element is switched ON and OFF with the priority pulse signal to perform the pulse charging.

Further, in the aforementioned fourth embodiment, the first and second pulse width modulator circuits 41, 42 generate pulse signals based on input power calculated by the accumulating circuit 24. However, the present invention is not limited thereto and the first pulse width modulator circuit 41 can generate a pulse signal based on an input current detected by the current detector circuit 21, also the second pulse width modulator circuit 42 can generate a pulse signal based on an input voltage detected by the voltage detector circuit 23.

Further, in the aforementioned embodiments, an input voltage, an input current or input power supplied from the direct current power source, or the power of the voltage regulating circuit or the current regulating circuit is detected, and the pulse charging is performed if the detection result exceeds a rated value. However, the present invention is not limited thereto and if the rated values are exceeded even if the pulse charging is performed, the charging operation itself can be stopped for preventing the danger. Furthermore, in the aforementioned embodiments, the current detector circuit is arranged on the positive pole side of the secondary battery BT and in addition, it is arranged on the negative pole side of the secondary battery BT. However, the current detector circuit can be arranged at either of the sides.

According to the present invention as described above, if a loss of current regulating means or voltage regulating means exceeds an allowable loss, the current regulating means or the voltage regulating means is intermittently operated with a pulse signal to suppress the loss of the current regulating means or the voltage regulating means and suppress heat generated thereby, thus making it possible to protect the current regulating means and the voltage regulating means from damages. Thus, it is possible to realize a battery charger capable of obviating damages in the current regulating means and the voltage regulating means.

Also, according to the present invention, since the current regulating means and the voltage regulating means are intermittently operated based on a priority pulse signal which is the one having the narrower pulse width out of a first pulse signal for the current regulating means and a second pulse signal for the voltage regulating means, losses of the current regulating means and the voltage regulating means can be simultaneously suppressed to prevent heat generated therein even if the current regulating means and the voltage regulating means have different losses, thus making it possible to protect the current regulating means and the voltage regulating means from damages. Thus, it is possible to realize a battery charger capable of obviating damages in the current regulating means and the voltage regulating means.

While there has been described in connection with the preferred embodiments of the invention, it will be obvious to those skilled in the art that various changes and modifications may be aimed, therefore to cover in the appended claims all such changes and modifications as fall within the true spirit and scope of the invention.

What is claimed is:

1. A battery charger having current regulating means and voltage regulating means connected in series for supplying a secondary battery with a charging current at or below a predetermined current value with said current regulating means and for supplying said secondary battery with a charging voltage at or below a predetermined voltage value with said voltage regulating means in order to charge said secondary battery, said battery charger comprising:

pulse width modulating means for generating a pulse signal having a predetermined pulse width if a loss of at least one of said current regulating means and said voltage regulating means exceeds a predetermined loss, and control means for intermittently operating said at least one of said current regulating means and said voltage regulating means, when the loss exceeds said predetermined loss, based on said pulse signal.

2. The battery charger according to claim 1, further comprising voltage detecting means for detecting input voltage to be supplied to said secondary battery, wherein:

said pulse width modulating means, if a detection result of said voltage detecting means is above a rated value, generates said pulse signal having a pulse width according to said detection result; and said control means intermittently operates said voltage regulating means based on said pulse signal.

3. The battery charger according to claim 1, further comprising current detecting means for detecting input current to be supplied to said secondary battery, wherein:

said pulse width modulating means, if a detection result of said current detecting means is above a rated value, generates said pulse signal having a pulse width according to said detection result; and said control means intermittently operates said current regulating means based on said pulse signal.

4. The battery charger according to claim 1, further comprising:

voltage detecting means for detecting input voltage to be supplied to said secondary battery;

current detecting means for detecting input current to be supplied to said secondary battery; and accumulating means for respectively accumulating detection results of the said voltage detecting means and said current detecting means to calculate a value of input power supplied from a power source, wherein said pulse width modulating means, if the input power value calculated by said accumulating means is above a rated value, generates said pulse signal having a pulse width according to the calculated input power value, and said control means intermittently operates said current regulating means and said voltage regulating means based on said pulse signal.

5. The battery charger according to claim 1, further comprising:

current detecting means for detecting input current to be supplied to said secondary battery;

voltage detecting means for detecting a potential difference between an input and an output of said current regulating means; and accumulating means for respectively accumulating detection results of said current detecting means and said voltage detecting means to calculate a value of power of said current regulating means, wherein said pulse width modulating means, if the power value calculated by said accumulating means is above the rated value, generates said pulse signal having a pulse width according to the calculated power value, and said control means intermittently operates said current regulating means based on said pulse signal.

6. The battery charger according to claim 1, further comprising:

current detecting means for detecting input current to be supplied to said secondary battery;

voltage detecting means for detecting a potential difference between an input and an output of said current regulating means; and accumulating means for accumulating detection results of said current detecting means and said voltage detecting means to calculate a value of power of said voltage regulating means, wherein said pulse width modulating means, if the power value calculated by said accumulating means is above the rated value, generates said pulse signal having a pulse width according to the calculated sower value, and said control means intermittently operates said voltage regulating means based on said pulse signal.

7. The battery charger according to claim 1, wherein said current regulating means and said voltage regulating means comprise a parallel connection of a first line having a first current regulating circuit for outputting a first output current and a first voltage regulating circuit for outputting a first output voltage which are connected in series, and a second line having a second current regulating circuit for outputting a second output current and a second voltage regulating circuit for outputting a second output voltage which are connected in series.

8. The battery charger according to claim 1, further comprising a switch connected in parallel with said current regulating means for bypassing said current regulating means, wherein said control means switches said switch ON and OFF in response to said pulse signal.

9. The battery charger according to claim 1, wherein said current regulating means comprises a plurality of current regulating circuits having respective different output current values from each other, and said voltage regulating means comprises a plurality of voltage regulating circuits having respective different output voltage values from each other, and said battery charger further comprises:
 a change-over switch for switching said plurality of current regulating circuits and said plurality of voltage regulating circuits; and
 a switch control circuit for switching said change-over switch in accordance with a type of said secondary battery.

10. The battery charger according to claim 1, further comprising:

voltage detecting means including a plurality of current detector circuits having different detection current values for detecting input voltage;

current detecting means including a plurality of current detector circuits having different detection current values for detecting input current; and a mode switching circuit for notifying said pulse width modulating means of an optimal control mode in accordance with detector results of said voltage detector circuits and said current detector circuits, wherein said pulse width modulating means generates the pulse signal with an optimal pulse width in accordance with said control mode.

11. The battery charger according to claim 1, further comprising predetermined stop means for terminating operation of said current regulating means and said voltage regulating means, wherein said control means continuously operates said at least one of said current regulating means and said voltage regulating means which is being intermittently operated, based on said pulse signal from said pulse width modulating means and a stop signal from said predetermined stop means.

12. The battery charger according to claim 11, comprising current detecting means for detecting a fully charged state of said secondary battery by detecting input current while said current regulating means and said voltage regulating means are being continuously operated.

13. A battery charger having current regulating means and voltage regulating means connected in series, and using an input voltage and an input current supplied thereto from a power source, for supplying a secondary battery with a charging current at or below a predetermined current value with said current regulating means and for supplying said secondary battery with a charging voltage at or below a predetermined voltage value with said voltage regulating means in order to charge said secondary battery, said battery charger comprising:

first pulse width modulating means for generating a first pulse signal having a first desired pulse width if a loss of said current regulating means exceeds an allowable loss;

second pulse width modulating means for generating a second pulse signal having a second desired pulse width if a loss of said voltage regulating means exceeds an allowable loss;

priority pulse generating means for selecting a pulse signal having a narrower pulse width out of said first and second pulse signals and outputting the selected pulse signal as a priority pulse signal; and control means for intermittently operating said current regulating means and said voltage regulating means based on said priority pulse signal.

14. The battery charger according to claim 13, further comprising:

current detecting means for detecting a value of said input current, and said first pulse width modulating means, if the input current value detected by said current detection means is above a rated value, generating said first pulse signal having a first pulse width according to the detected input current value; and voltage detecting means for detecting a value of said input voltage, and said second width pulse detecting means, if the input voltage value detected by said voltage detecting means is about a rated value, generating said second pulse signal having a second pulse width according to the detected input voltage value.

15. The battery charger according to claim 13, further comprising:

current detecting means for detecting said input current;

voltage detecting means for detecting said input voltage; and accumulating means for accumulating detection results of said voltage detecting means and said current detecting means to calculate a value of input power supplied from said power source, and wherein first and second pulse width modulating means, if the input sower value calculated by said accumulating means is above a rated value, generate said first and second pulse signals, respectively.

16. The battery charger according to claim 13, wherein said control means continuously operates at least one of said current regulating means and said voltage regulating means which is being intermittently operated, based on said priority pulse signal from said priority pulse generating means.

17. The battery charger according to claim 13, comprising current detecting means for detecting a fully charged state of said secondary battery by detecting said input current while said current regulating means and said voltage regulating means are being continuously operated.

18. A battery charging method of a battery charger having current regulating means and voltage regulating means connected in series, and using an input voltage and an input current supplied thereto from a power source, for supplying a secondary battery with a charging current at or below a predetermined current value with said current regulating means and for supplying said secondary battery with a charging voltage at or below a predetermining voltage value with said voltage regulating means in order to charge said secondary battery, comprising the step of, if a loss of at least one of said current regulating means and said voltage regulating means exceeds predetermined loss, intermittently operating said at least one of said current regulating means and said voltage regulating means, having said loss exceeding the predetermined loss, based on a pulse signal having a predetermined pulse width.

19. A battery charging method of a battery charger having current regulating means and voltage regulating means connected in series, and using an input voltage and an input current supplied thereto from a power source, for supplying a secondary battery with a charging current at or below a predetermined current value with said current regulating means for supplying said secondary battery with a charging voltage at or below a predetermined voltage value with said voltage regulating means for supplying said secondary battery, said battery charging method comprising the steps of:

generating a first pulse signal having a first desired pulse width if a loss of said current regulating means exceeds a first loss;

generating a second pulse signal having a second desired pulse width if a loss of said voltage regulating means exceeds a second loss;

selecting a pulse signal having a narrower pulse width out of said first and second pulse signals and outputting the selected pulse signal as a priority pulse signal; and intermittently operating said current regulating means and said voltage regulating means based on said priority pulse signal.

* * * * *